(12) United States Patent
Fraser et al.

(10) Patent No.: US 12,536,496 B1
(45) Date of Patent: Jan. 27, 2026

(54) ENERGY MONITORING REPLENISHMENT SERVICE

(71) Applicant: Amazon Technologies, Inc., Seattle, WA (US)

(72) Inventors: Thomas Grant Fraser, Edmonds, WA (US); Andrew Norton Moor Weaver, Redmond, WA (US); Arielle Rachel Bertman, Seattle, WA (US); Matthew Liang Chaboud, San Francisco, CA (US); Cameron Dean Whitehouse, Seattle, WA (US); Jesse Norman Clark, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 18/181,367

(22) Filed: Mar. 9, 2023

Related U.S. Application Data

(62) Division of application No. 16/438,965, filed on Jun. 12, 2019, now abandoned.

(51) Int. Cl.
*G06Q 10/087* (2023.01)
*G06Q 30/0601* (2023.01)
*H04W 4/35* (2018.01)

(52) U.S. Cl.
CPC ....... *G06Q 10/087* (2013.01); *G06Q 30/0603* (2013.01); *G06Q 30/0617* (2013.01);
(Continued)

(58) Field of Classification Search
CPC ............. G06Q 10/087; G06Q 30/0603; G06Q 30/0617; G06Q 30/0635; G06Q 30/0641; H04W 4/35
See application file for complete search history.

(56) References Cited

U.S. PATENT DOCUMENTS 6,700,333 B1 3/2004 Hirshi et al.
8,131,497 B2 3/2012 Steinberg et al.
(Continued)

FOREIGN PATENT DOCUMENTS

WO 2010103332 A1 9/2010

OTHER PUBLICATIONS

Blackford, J., "The Future of Computing: For 500,000 Years Technology has Advanced While People Remained the Same. In the next Millennium, the Human Race Plays Catch-Up," Computer Shopper, 19(12) 319, retrieved from https://dialog.proquest.com/professional/docview/668855858?accountid=142257, 1999.
(Continued)

*Primary Examiner* — Peter Ludwig
*Assistant Examiner* — Reva R Moore
(74) *Attorney, Agent, or Firm* — Athorus, PLLC

(57) ABSTRACT

Described implementations determine or monitor one or more parameters of an electrical circuit at a location to determine device usage at the location and utilize that information to determine when consumable inventory at the location is depleted and should be reordered. For example, when a device at the location is turned on, the device affects voltage that is introduced into the voltage signal at the location and detectable by, for example, a plug-in sensor. Different devices generate different patterns or signatures of voltage as they operate, thereby making the signatures unique, or almost unique, to different device types and/or different devices. Utilizing this information for devices that utilize consumable inventory, such as coffee pods, laundry detergent, dishwashing detergent, frozen dinners, popcorn, etc., it can be determined when the consumable inventory is depleted and should be reordered.

20 Claims, 13 Drawing Sheets

(52) U.S. Cl.
CPC ..... *G06Q 30/0635* (2013.01); *G06Q 30/0641* (2013.01); *H04W 4/35* (2018.02)

(56) References Cited

U.S. PATENT DOCUMENTS

| | | | |
|---|---|---|---|
| 8,244,405 B2 | 8/2012 | Kao et al. | |
| 8,423,322 B2 | 4/2013 | Steinberg et al. | |
| 8,498,753 B2 | 7/2013 | Steinberg et al. | |
| 9,146,548 B2 | 9/2015 | Chambers et al. | |
| 10,018,371 B2 | 7/2018 | Steinberg et al. | |
| 10,306,705 B2 | 5/2019 | Shanmugam et al. | |
| 10,373,234 B2 | 8/2019 | Depew | |
| 2006/0151529 A1 | 7/2006 | Crisp | |
| 2009/0230950 A1 | 9/2009 | Czarnecki | |
| 2010/0079132 A1 | 4/2010 | Steele et al. | |
| 2012/0302092 A1 | 11/2012 | Kaps et al. | |
| 2013/0041605 A1* | 2/2013 | Ting | G01D 4/002 702/62 |
| 2013/0127248 A1 | 5/2013 | Lai | |
| 2013/0132008 A1 | 5/2013 | Borean et al. | |
| 2013/0254151 A1 | 9/2013 | Mohagheghi et al. | |
| 2014/0136348 A1 | 5/2014 | Carroll et al. | |
| 2014/0177737 A1 | 6/2014 | Vasquez et al. | |
| 2014/0225603 A1 | 8/2014 | Auguste et al. | |
| 2014/0333322 A1 | 11/2014 | Kabler et al. | |
| 2015/0039391 A1 | 2/2015 | Hershkovitz et al. | |
| 2015/0077243 A1 | 3/2015 | Hooper et al. | |
| 2015/0253364 A1 | 9/2015 | Hieda et al. | |
| 2015/0363866 A1* | 12/2015 | Depew | G06Q 30/0633 705/26.8 |
| 2017/0300984 A1 | 10/2017 | Hurwich | |
| 2018/0080970 A1 | 3/2018 | Kraus et al. | |
| 2019/0392378 A1* | 12/2019 | Alvo | G06Q 10/087 |
| 2020/0003659 A1 | 1/2020 | Davies et al. | |
| 2020/0149981 A1 | 5/2020 | Koeppl et al. | |

OTHER PUBLICATIONS

International Search Report and Written Opinion mailed Sep. 8, 2015 for International Application No. PCT/US2015/036018, 11 pages.

P3 International, "Kill a Watt," P3 International Corporation, Copyright 2014 http://www.p3international.com/products/p4400.html (downloaded Jun. 27, 2014, by web.archive.org), 1 page.

* cited by examiner

ENERGY MONITORING REPLENISHMENT SERVICE

PRIORITY CLAIM

The application is a Divisional of U.S. patent application Ser. No. 16/438,965, filed Jun. 12, 2019, and titled "Energy Monitoring Replenishment Service," the contents of which are herein incorporated by reference in their entirety.

BACKGROUND

Some devices keep track of operational state and estimate when parts or items used by the device need to be replaced. For example, some home printers will present a notification on the printer display when they are out of paper or need to have an ink cartridge refilled. While such devices provide information to users when service or inputs are needed for the device, the information is device specific and provided by the device directly.

BRIEF DESCRIPTION OF DRAWINGS

The detailed description is described with reference to the accompanying figures.

DETAILED DESCRIPTION

Figure 1:
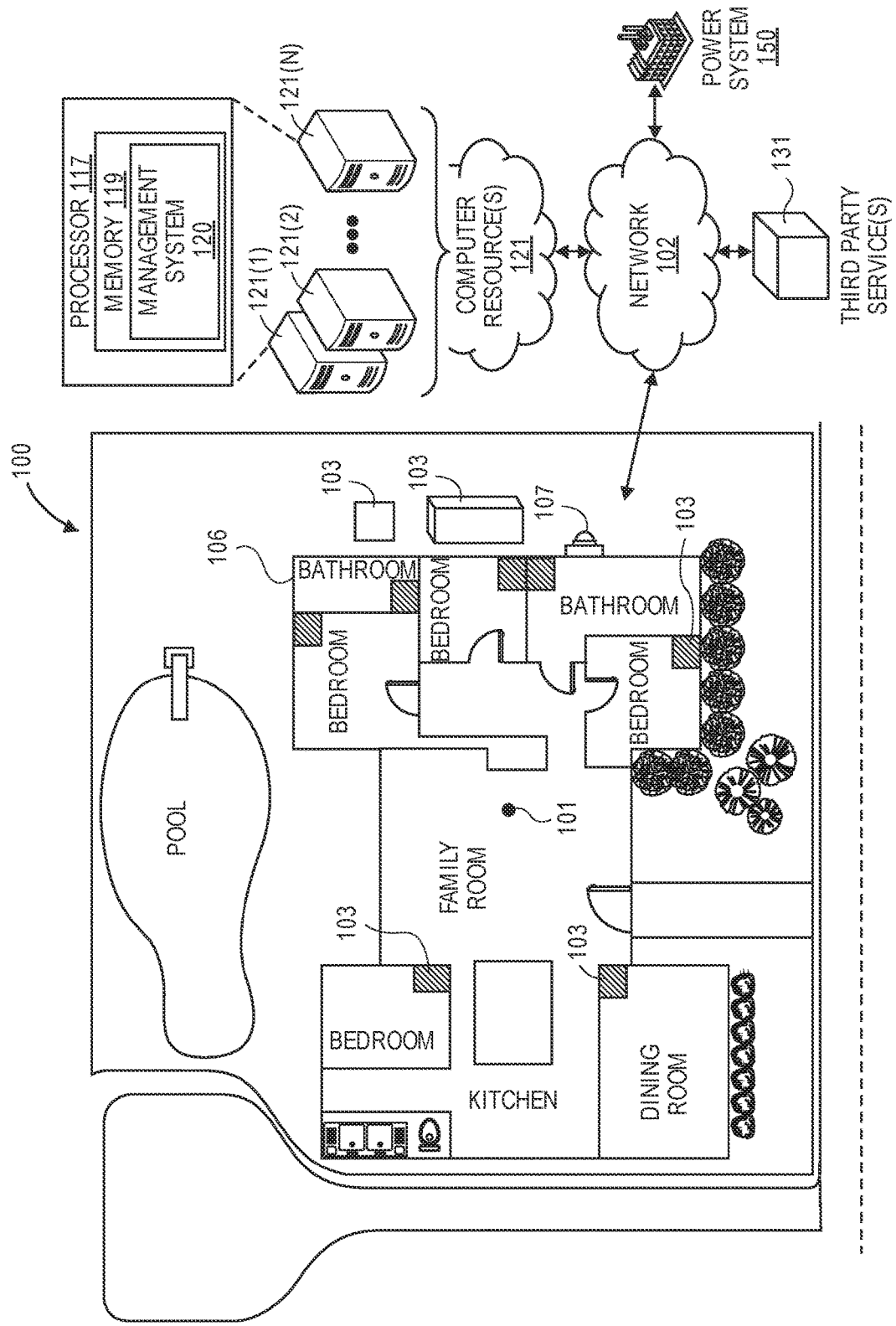
FIG. 1 is a block diagram of a location for which energy consumption is to be monitored and used to determine when consumable inventory types are depleted and should be reordered, in accordance with described implementations.

Described are systems, methods, and apparatus that monitor parameters, such as potential voltage, current, acoustics, radio frequency ("RF") field interference, etc., at a location to determine device usage at the location and utilize that information to determine when consumable inventory at the location is depleted and should be replinished. For example, when a device at the location is turned on, the device generates voltage that is introduced into the voltage signal at the location and detectable by, for example, a plug-in sensor. Different devices generate different patterns or signatures as they operate, also referred to herein as signature data, thereby making the signatures unique, or almost unique, to different device types and/or different devices. For example, the voltage pattern (signature data) introduced by operation of a microwave is very different than the voltage pattern of a washing machine. By monitoring for signature data in the voltage, operation of devices at the location can be determined, along with start times and stop times of those operations associated with the various devices. Similar detections of device operation may also be determined by monitoring other parameters, such as current, RF field interference, acoustics, etc. Using this information for devices that utilize consumable inventory, such as coffee pods, laundry detergent, dishwashing detergent, frozen dinners, popcorn, etc., it can be determined when the consumable inventory type is depleted and should be reordered.

In some implementations, device information from multiple devices and/or other information may be utilized together to determine what consumable inventory type has been used. For example, if it is determined that the light in the freezer is illuminated in response to the freezer door opening then closing, then it is determined that the toaster is in use, and additional information indicates that the time is morning, that information, or the sequence thereof, may be used to determine that a frozen consumable inventory type, such as a waffle, has been consumed.

In some implementations, one or more users at the location may affirmatively opt-in or select to participate in a system that utilizes purchase history of the user, also referred to herein as user history, or information provided by the user with regard to consumable inventory, along with detected device information to determine consumption and depletion of consumable inventory types at the location. For example, the consumable inventory type may be purchased from an electronic commerce ("e-commerce") website for delivery to the location and that purchase information may be selected by the user for use along with energy monitoring information at a location associated with the user to determine when consumable inventory purchased via the e-commerce website has been depleted. Alternatively, or in addition thereto, the user may provide a starting inventory quantity for one or more inventory items that the system is to monitor for depletion, in accordance with described implementations. In some implementations, as discussed further below, the system may monitor for both consumable inventory depletion as well as the rate of depletion to determine when additional inventory for that consumable is to be ordered.

In some implementations, parameters (e.g., signature data) determined by the plug-in sensor, along with the start time and stop time corresponding to each detected signature and respective state of the device, is provided to a remote computing system, referred to herein as a management system. The management system maintains location profiles for each location, consumable inventory data for the locations, user profiles for users at or associated with the various locations, and may also receive third party data, such as energy consumption information for the location, weather patterns, device signals, etc. The location profiles may identify characteristics about each location, identification of devices at the location, signature data for those devices and/or different states for those devices, the size of a structure at the location, identification of users that occupy the location, the orientation of the location, the altitude of the location, etc. The consumable inventory data may indicate the types of consumables at the location, the quantity of those consumables at the location, the device or devices at the location that consume the consumable inventory types, and the consumption rate at which those consumables are being used at the location.

In some implementations, the management system may process the signature data to identify the device and/or the device state of a device that generated the signature data. In other implementations, device identification may be done by the plug-in sensor. In still other implementations, the plug-in sensor may store signature data for previously identified devices at the location and, if a detected signature matches one of the stored signature data, the plug-in sensor may identify the device and/or the device state of the device. However, if a detected signature does not match a stored signature, the detected signature may be transmitted from the plug-in sensor to the remote management system for additional analysis. The remote management system may compare the received signature data with a larger data set of signature data to determine a device type, a device of the device type, and/or a device state of the device. Once identified, the signature data and the device identification and/or device state identification may be provided to the plug-in sensor and used in the future by the plug-in sensor to identify the device and/or the device state.

In addition, upon determining the device that generated the signal, it may be determined from the consumable inventory data whether one or more consumable inventory types are associated with that device or a combination of devices that include that device. If a consumable inventory type is associated with the device, a quantity of the consumable may be decremented to account for the operation of the device. Similarly, if a consumable is associated with a combination of devices that include that device, and the received data indicates the operation of those combination of devices, the consumable inventory may likewise be decremented.

Finally, it may be determined whether the quantity of the consumable has been depleted to a re-order level, and optionally, the rate of the depletion. For example, if the detected device is a coffee maker and the associated consumable inventory type is coffee pods, the system as discussed herein may decrement an item count of the coffee pods, determine that the amount remaining is below a threshold, and either recommend to a user that additional coffee pods should be ordered or, alternatively, automatically order additional coffee pods so that the additional coffee pods are delivered before the current inventory of coffee pods are fully depleted. In some implementations, the rate of consumption may also be determined and the recommendation to re-order, or the automatic reorder, adjusted based on that rate of consumption. For example, if the threshold level of coffee pods is five, but it is determined that the coffee pods are only consumed at a rate of one pod per week, rather than recommending or automatically reordering the pods now, the disclosed implementations may determine that the inventory will not be fully depleted for another five weeks and delay the re-order, depending on the estimated delivery time for the item. For example, if the delivery time for the item is three days, the disclosed implementations may delay re-order for another two to three weeks because, even with the delay, the consumable inventory type will likely be replenished before it is fully depleted.

FIG. 1 is a block diagram of a location 100 for which device usage is to be monitored, in accordance with described implementations. In this example, the location is a home location that includes a structure 106 in the form of a personal residence. It will be appreciated that the location and corresponding structure may be any location or structure for which parameters on an electrical circuit and consumable inventory type usage is monitored and replenished, in accordance with the described implementations. For example, the location may be residential, business, commercial, public, etc. Likewise, the structure may be a personal residence, apartment, office building, government building, municipal building, entertainment facility (e.g., coliseum, stadium), shopping facility, etc.

One or more plug-in sensors 101 may be positioned at the location by simply plugging in the plug-in sensor into any electrical outlet at the location 100. In some implementations, two plug-in sensors 101 may be utilized at the location, one monitoring each phase of a two-phase power supply at the location. In other implementations, only a single plug-in sensor may be utilized. Additional details about an example plug-in sensor are discussed further below with respect to FIG. 11.

While the described examples are described with respect to collecting information from an example plug-in sensor to determine device usage and corresponding consumable inventory type usage, in other implementations, other forms of monitoring parameters that may be used to determine device operation are equally applicable to the disclosed implementations. For example, current on the electrical circuit may be monitored and signature data generated that may be used to determine device operation. In another example, acoustic sensing and/or RF field interference may be monitored and used to determine device operation. Likewise, in some implementations, signatures from multiple different sources, such as voltage, electrical, acoustics, RF field interference, etc. may be used together to determine device operation. Still further, while the examples discussed herein describe monitoring for changes using a plug-in sensor, in other implementations, the sensor may not be a plug-in sensor that is plugged into an outlet of the electrical circuit. For example, in some implementations, the sensor may monitor for RF field interference and operate on batter or solar power. In such an example, the sensor may not be plugged into the electrical outlet. Accordingly, unless otherwise specified, any type of system or sensor that monitors one or more parameters that may be processed to determine device operation or usage, may be utilized with the described implementations.

Likewise, each location includes one or more devices 103 that consume variable amounts of energy based on their usage. The devices 103 may be internal or inside the structure 106, or external or outside the structure 106, and may provide various functions. In some implementations, the devices may be configured to communicate with a communication component to either receive operation instructions and/or to provide usage information.

As discussed herein, upon installation, the plug-in sensor monitors parameters on the electrical circuit of the location. For example, the plug-in sensor may monitor for voltage changes at the location and extract from a baseline voltage for the location, detected voltage changes. For example, a location in the United States may receive 120 volts at 60 Hertz ("Hz") frequency, which represents a baseline that is known for the plug-in sensor. The plug-in sensor may then monitor for voltage changes at the location by periodically subtracting the baseline from actual voltage measurements at the location. The remaining voltage is representative of changes at the location and, over a period of time, the determined voltage changes represent signature data for a device that is operating during that period of time and/or a device state for the device.

The plug-in sensor 101, in some implementations, may also introduce a known load, such a resistive load, an inductive load, or a capacitive load, into the existing circuit at the location and monitor for changes as a result of the introduced load. Load introduction may be performed when the plug-in sensor is first connected to the circuit to aid in determining the topology and/or characteristics of the circuit at the location. Likewise, if there is more than one plug-in sensor at the location, a code may be transmitted by a first plug-in sensor that is detectable by the second plug-in sensor and utilized to determine if the two plug-in sensors are on the same phase of the circuit at the location. For example, if the code is detected by the second plug-in sensor, it may be determined that the two plug-in sensors are on the same phase. If the code is not detected, it may be determined that the two plug-in sensors are on different phases of the circuit.

Still further, a first plug-in sensor may introduce a load into the circuit that is detectable by the second plug-in sensor and utilized to determine if the two plug-in sensors are on the same branch of the circuit at the location. For example, if there is little to no attenuation or impedance change between the signal produced in response to the introduced load as measured at the first plug-in sensor and measured at the second plug-in sensor, it may be determined that both plug-in sensors are on the same circuit branch. In comparison, if there is a measurable attenuation or impedance change, it may be determined that the two plug-in sensors are on different branches of the electrical circuit at the location.

If it is determined that both plug-in sensors are on the same phase and/or same branch of the circuit, a user may be notified and requested to move one of the plug-in sensors to a different location, such as a different electrical outlet at the location, in an effort to position both plug-in sensors on different phases and/or branches of the electrical circuit. By having a plug-in sensor on each phase of the circuit and/or on different branches, better detection of devices at the location may be available in comparison to a single plug-in sensor or having multiple plug-in sensors on the same phase and/or branch of the circuit.

As signature data is collected by the plug-in sensor, the signature data may be used by the plug-in sensor to identify a device that generated the signature data and/or to determine the state of the device that generated the signature data. In addition, or as an alternative thereto, the signature data may be provided to the management system 120 via a network 102, such as the Internet.

The location may also include a power meter 107 that measures the amount of energy consumed at the location. In some implementations, the power meter 107 may include a wireless component that transmits energy consumption data at periodic intervals and/or that may be polled and, in response to a poll, provide energy consumption data. In such an implementation, the energy consumption data may be obtained locally from the power meter 107 by the plug-in sensor and/or by another component at the location (e.g., communication hub) and used to determine the amount of energy consumed by a device during operation of that device or during a particular operating state of the device.

The system may also include computing resource(s) 121. The computing resource(s) 121 are remote from the location 100. Likewise, the computing resource(s) 121 may be configured to communicate over a network 102 with the location 100, the plug-in sensor 101, and/or the devices 103. Likewise, the computing resource(s) 121 may communicate over the network 102 with one or more power systems 150, and/or one or more third party service(s) 131.

As illustrated, the computing resource(s) 121 may be implemented as one or more servers 121(1), 121(2), . . . , 121(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc. The computing resources 121 may process signature data received from plug-in sensor 101, data from third parties 131 and/or data from the power system 150 to determine devices in operation at the location and/or energy consumed by those devices when operating at the location 100.

The server system(s) 121 does not require end-agent knowledge of the physical location and configuration of the system that delivers the services. Common expressions associated for these remote computing resource(s) 121 include "on-demand computing," "software as a service (SaaS)," "platform computing," "network-accessible platform," "cloud services," "data centers," and so forth. Each of the servers 121(1)-(N) include a processor 117 and memory 119, which may store or otherwise have access to a management system 120, as described herein.

The network 102, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 2:
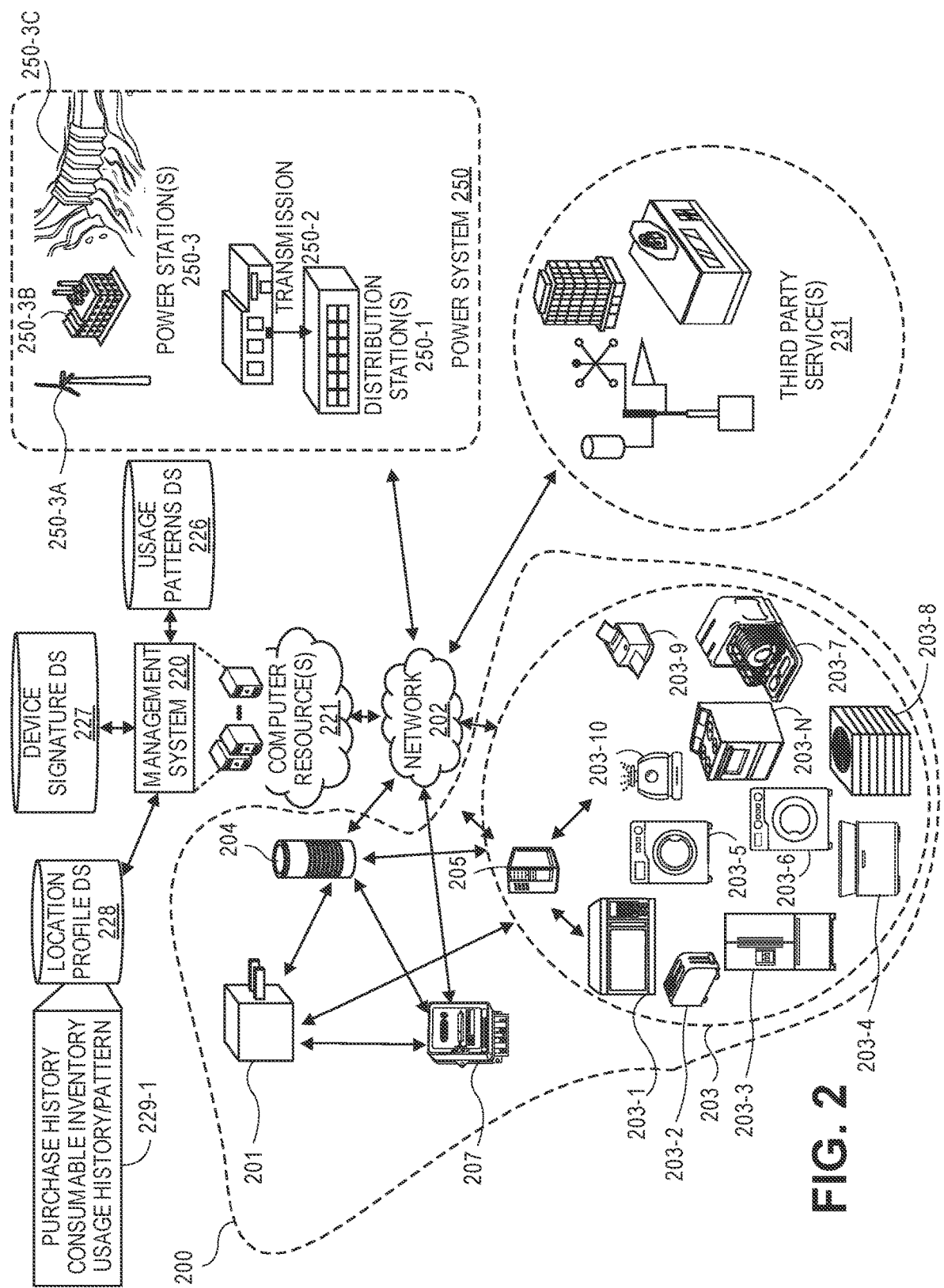
FIG. 2 illustrates a plug-in sensor and devices of the location illustrated in FIG. 1 and the communication paths with remote systems and services, in accordance with described implementations.

FIG. 2 illustrates additional details of a plug-in sensor 201, devices 203, third party systems 231, and the power system 250 illustrated in FIG. 1 and the communication paths therebetween, in accordance with described implementations. Example hardware configurations of the plug-in sensor 201 are discussed further below with respect to FIG. 11. In some implementations, the plug-in sensor 201 may be a stand-alone device that may be plugged into any electrical outlet at the location and used to detect device operation of any other device at the location that is plugged into any other outlet at the location. In other examples, the plug-in sensor 201 may be incorporated into a device 203 and/or included as part of a communication component 204.

The plug-in sensor 201 may by powered by the electrical system at the location, by battery power, and/or powered from other devices or components. For example, the plug-in sensor 201 may harvest power from the electrical outlet into which it is installed.

In addition to collecting signature data, the plug-in sensor 201 may be configured to communicate with devices 203, a power meter 207 at the location 200, and/or a communication component 204 that is also positioned within the location. For example, the plug-in sensor 201 may include a wireless transmitter/receiver that is operable to connect to a wireless network 202 and provide determined signature data to other devices and/or the communication component via the wireless network. In other implementations, the plug-in sensor 201 may be configured to transmit data, such as detected signature data, start time and/or stop time of device state changes, and/or device identifiers, to other components, such as the communication component 204 via the electrical circuit at the location.

Any form of wired and/or wireless communication may be utilized to facilitate communication between the devices and/or sensors. For example, any one or more of 802.15.4 (ZIGBEE), 802.11 (WI-FI), 802.16 (WiMAX), BLUETOOTH, Z-WAVE, near field communication ("NFC"), etc., may be used to communicate between the devices and one or more sensors.

Devices 203 at a location may include any one or more items that consume energy during operation. In some instances, those devices may also consume one or more consumable inventory types with each operation. Examples of devices include, but are not limited to microwaves 203-1, toasters 203-2, refrigerators 203-3, freezers 203-4, washing machines 203-5, dryers 203-6, dishwashers 203-7, HVACs 203-8, printers 203-9, coffee makers 203-10, etc. 203-N. In some implementations, the devices may be connected devices capable of receiving instructions, referred to herein as command data, from the management system 220, via a communication hub 205, via the communication component 204, and/or directly. In other implementations, one or more devices may not be connected and may only be controllable by either a user at the location and/or by controlling the circuit that provides power to the device.

Connected devices 203 are configured to receive and execute instructions included in command data sent from the management system 220 operating on a remote computing resource directly, via the hub 205 that is positioned at the location, and/or via the communication component that is positioned at the location. Likewise, in some implementations, the devices may be further configured to transmit or send operational information (e.g., energy consumption, errors, etc.) to the management system, the plug-in sensor, and/or the communication component 204.

Examples of consumable inventory types that may be associated with a device or a combination of devices are illustrated in the following non-exclusive Table 1:

TABLE 1

| Consumable Inventory Type | Device/Device Combination |
| --- | --- |
| Coffee pods | Coffee maker |
| Coffee grounds | Coffee maker |
| Coffee filters | Coffee maker |
| Dryer sheets | Dryer |
| Laundry detergent | Washing machine |
| Dishwasher detergent/pods | Dishwashing machine |
| Frozen waffle | Freezer light -> toaster |
| Creamer | Refrigerator light + coffee maker |
| Frozen dinners | Freezer light -> microwave; Series of microwave operation patterns |
| Popcorn | Microwave operation pattern |

TABLE 1-continued

| Consumable Inventory Type | Device/Device Combination |
| --- | --- |
| Ink cartridge | Printer |
| Paper | Printer |
| . . . | . . . |

In some implementations, the communication hub 205 may forward signature data received from the plug-in sensor 201 to the management system for processing by the management system 220 and/or forward command data received from the management system 220 to various devices 203 for execution. In other implementations, some or all of the processing of the signature data may be performed by the communication hub 205. For example, the communication hub 205 may receive signature data from the plug-in sensor 201 and compare the signature data with stored signature data representative of devices and/or device states of devices at the location to determine the device and/or the device state of a device that was operating and that generated the signature data. In other implementations, the communication hub 205 may receive voltage data from the plug-in sensor, process the data to determine the signature data, and then utilize the signature data to determine the operating device and/or the state of the operating device. In still other examples, voltage data may be sent to the remote management system and the remote management system may process the voltage data to determine the signature data, devices, device state, etc.

Likewise, any one or a combination of the communication hub 205 or the management system 220 may maintain a list of consumable inventory types for the location and corresponding devices or device patterns to determine if a consumable inventory type has been used with the operation of the detected device, as discussed further below.

While the described implementation discusses a communication hub 205 and a communication component 204 as distinct components, in some implementations, the operation and functions described herein may be performed entirely by one or both of the communication hub 205 or the communication component 204. Accordingly, the use of the terms communication hub 205 and communication component 204 may, in some implementations, be utilized interchangeably.

Regardless of whether signature data is determined at the plug-in sensor 201, the communication hub 205, the remote computing system 221, and/or some combination thereof, based on the determined parameters, such as signature data determined from the electrical circuit, a device type, a specific device, and/or a device state of a device may be identified. For example, as discussed further below, the plug-in sensor 201 and/or the communication hub 205 at the location may maintain, in a memory, stored signature data corresponding to devices, device types, and/or device states of devices known to be at the location. When signature data is detected by the plug-in sensor 201, the plug-in sensor and/or communication hub may compare the determined signature data with the stored signature data to determine if the signature data corresponds to a known device, device type, and/or device state of a device known to be at the location. If a match is found, the plug-in sensor may transmit to the communication hub 205 and/or the remote management system 220, a device identifier for the device or device type and/or a device state identifier for a state of the device, along with a start time and a stop time of the device state, indicating a start and stop or change in state of the device 203, as determined from the signature data detected in the voltage data. Device state may be any state or detectable change in a device. A device may have two states (on and off) or multiple states. For example, a microwave may have multiple states, including, standby, on, activation of the rotatable table, energizing of the magnetron, different power levels, and off.

In comparison, if the signature data is not matched with a stored signature data, the signature data may be sent to the management system 220 for additional analysis. As will be appreciated, the management system 220 may comprise additional compute capacity as well as additional data storage of additional signature data of other devices. For example, the management system may maintain a device signature data store 227 that includes signature data for a large variety of devices, device types, and/or device states.

Signature data that are maintained in the device signature data store 227 may be generated or obtained from a variety of sources. For example, device manufacturers may provide device signature data for devices and/or device states of devices. In other implementations, as devices and/or device states are identified at different locations, those device signature data may be aggregated, combined, or added to the device signature data store and used in determining other devices and/or device states at other locations. For example, there may be some signature variation between multiple instances of the same type of device or the same device state of multiple devices of the same device type. As the devices and/or device states are determined at locations, the range of that variation may be updated and used in detecting other instances of that device and/or device state. Accordingly, as additional devices, device states, and/or instances of devices/device states are identified at different locations, those signatures may be included in the signature data store 227, thereby increasing the management system's 220 ability to identify devices/device states at different locations and to determine if those devices are operating within an expected range, as indicated by the device signature data detected for the device or a device state of that device.

When the management system 220 receives signature data, it may first compare the signature data with device type signatures to determine a device type (e.g., refrigerator, television, toaster, heater) of the device that generated the signature data. Upon determining a device type, the management system may then compare the signature data with signature data of that device type to determine a match having a highest similarity with the signature data, thereby determining the device and/or the device state of the device. In some implementations, upon determination of the device, device type, and/or device state, the management system may send to the communication hub at the location, and/or to the plug-in sensor, an identification of the newly identified device, device type, and/or device state along with the corresponding signature data. Such information may be added to the stored signature data at the location and/or added to the location profile data store 228 that is maintained by the management system 220.

In some implementations, additional information from other devices at the location may also be utilized by the communication hub 204 and/or the management system 220 to determine the device. For example, information received from one or more connected devices may be used to limit or identify candidate devices that are known to be operating and/or to remove from consideration devices that are known to not be operating. Likewise, sensors at the location may be used to assist in device determination. For example, a light or motion sensor may provide data indicating whether a person is moving in areas of the location and/or whether lights are on/off within areas of the location. As another example, image data and/or other information, such as device identification of a device in the possession of a person, may be used to identify a person at the location. Such information may be used to expand or reduce the list of candidate devices that may be operating and generating the detected signal.

In addition to determining a device, the device state of the device, and/or a combination of devices, the communication component 205 and/or the management system 220 may also determine if a consumable inventory type was consumed at the location 200 based on the determined operation of the device or combination of devices. For example, the management system 220 may maintain in a location profile data store 228 purchase history or an inventory count of consumable inventory types at the location 229-1, usage history of those consumable inventory types and the device, device state(s), or combination of devices that are operated when a unit of a consumable inventory type is used. Based on the determined device, device state, or combination of device, and the information from the location profile data store 228 for the location 200, it may be determined if an inventory count for one or more consumable inventory types associated with the location is to be depleted.

In some implementations, third party systems 231 may also provide data, such as weather data, device data, expected energy consumption for devices, device signature data, etc., to the management system 220. Third party systems include any type of system or service that is independent of the location that provides data that may be used by the management system 220 to determine energy saving actions that may be performed by one or more devices at the location. For example, the third-party system 231 may be a device manufacturer that provides expected energy consumption information for devices and/or signature data for devices. In such an example, the management system 220 may utilize the expected energy consumption information for a device to determine if that specific device is operating as expected and/or whether replacement of an existing device with a different device of the same device type will save energy. Likewise, the signature data for the device may be used to detect operation of the device at a location, as discussed herein.

The power system 250 may also communicate with the management system 220 and provide, for example, energy consumption information for the location, demanded power information, or load on the power system, forecasted power demands, costs per unit of power under different operational constraints, etc. For example, the power system 250 may provide information to the management system indicating which power stations are currently operating, the cost per unit of energy produced, and the current load on the power station, also referred to herein as load value. Alternatively, or in addition thereto, energy consumption for a specific location may be provided by a device at the location, such as the power meter 207.

A power system 250 typically includes one or more power station(s) 250-3, transmission station(s) 250-2, and distribution station(s) 250-1. Locations, such as location 200 create demand for power provided by the power system 250 and pay for that power.

Power stations 250-3 may include any form of power generation. For example, a power station 250-3 may be a wind based power station 250-3A, such as a wind farm, a fossil-fuel based power station 250-3B, a hydroelectric power station 250-3C, a solar power station, a nuclear power station, etc. The power system 250 may include any number and type of power stations 250-3.

Electric-power generated by the power stations 250-3 is bulk transmitted at high-voltages via a series of transmission 250-2 lines and stations from the generating power stations 250-3 to distribution stations 250-1. Transmission 250-2 lines and stations when interconnected with each other create transmission networks, which are often referred to as "power grids." The United States has three major power grids, the Western Interconnection, the Eastern Interconnection and the Electric Reliability Council of Texas (ERCOT) grid, often referred to as the Western Grid, the Eastern Grid and the Texas Grid.

The distribution stations 250-1 are located near the locations 200 that create the demand for the power. The distribution stations 250-1 receive the bulk transmissions, step down the voltage and distribute the electricity to end locations 200, such as residential housing, businesses, commercial buildings, etc.

A few of the major constraints with power systems is that power within the system must run at the same frequency and, with only a few exceptions, electrical energy cannot be stored. As such, power must be generated and supplied in real-time at a rate that matches demand. If the demand for power exceeds supply, additional power stations 250-3 must be activated to fulfill the additional demand, or brownouts or blackouts may be experienced at numerous locations that rely upon that power. The distribution stations typically bill the locations for the consumption of energy as a measure of kilowatt-hours (kWh), which is a measure of energy. The rate per kWh generally varies based on the current power demand or load of the power system and/or based on the average or expected power demand on the power system. As the power demand on the power system 250 increases, the cost per unit of energy consumed by each location likewise typically increases.

The implementations described herein receive the signature data and start/stop times of operation from a location and determine, based on consumable information for the location, whether one or more consumable inventory types associated with the location have been used. In addition, it may be determined whether, based on the consumption and optionally the rate of depletion of the consumable, whether the consumed items should be replenished. Replenishment may be done automatically, for example by an order placed through an e-commerce site, and/or a user may be notified and provided a recommendation or suggestion that the item be replenished.

Figure 3:
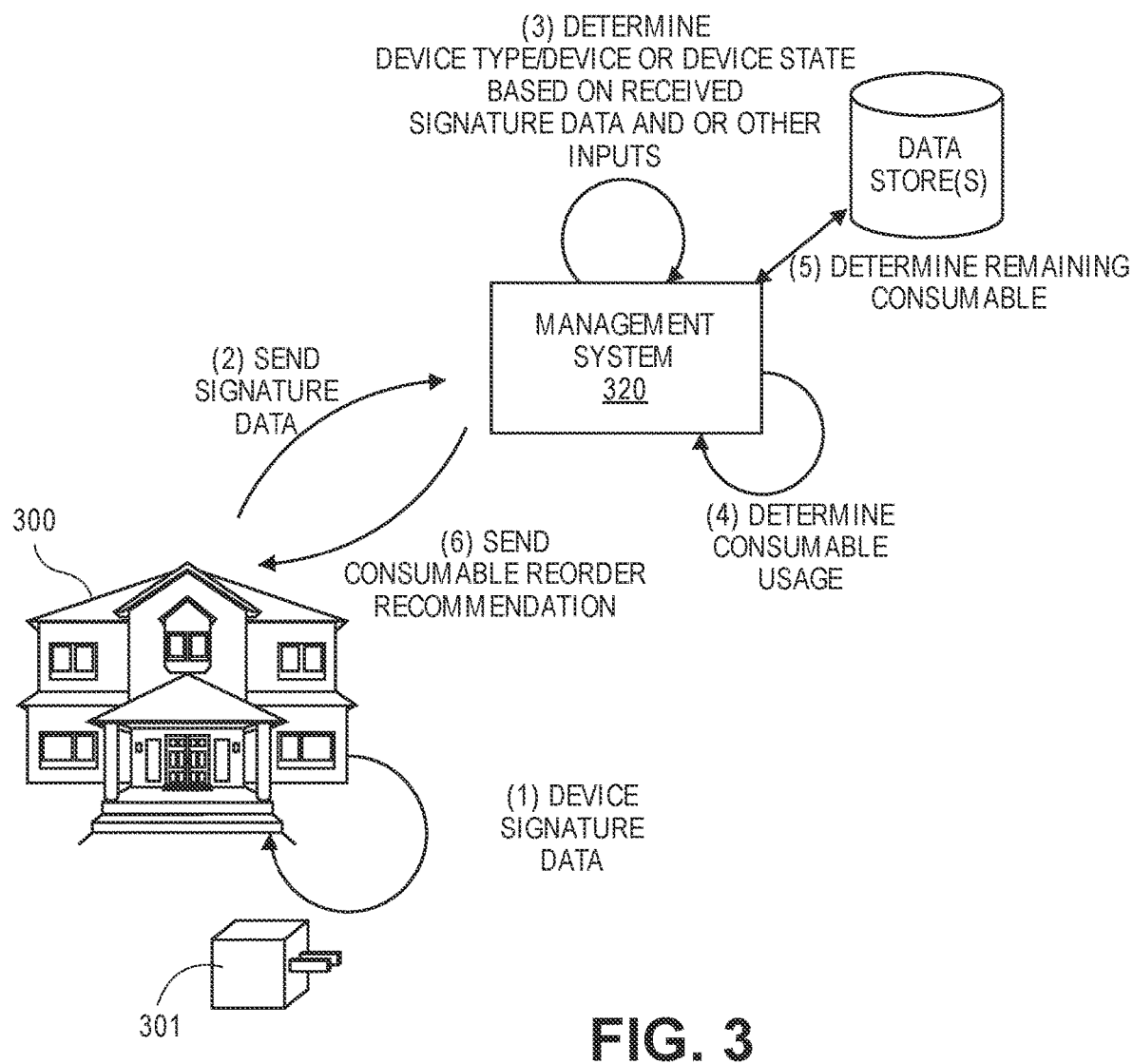
FIG. 3 illustrates an example messaging exchange as part of consumable inventory replenishment process at a location, in accordance with described implementations.

For example, FIG. 3 illustrates an example messaging exchange as part of a process for determining a consumed item at a location 300 and whether the item should be replenished, in accordance with described implementations. In this example, the plug-in sensor 301 monitors for changes in voltage at the location 300. Upon detection of a voltage change, the plug-in sensor 301 determines a signature data represented by the change in the voltage and a start time and stop time for operation of a device that is causing the change in the voltage at the location 300.

In this example, the start time, stop time, and signature data are sent from the location to the management system 320 for additional processing. At the management system 320, the signature data is compared with stored signature data associated with devices, device types and/or device states to determine a device type, a device, and/or a device state that matches the received signature data. For example, signature data of a dishwasher operation, as represented by voltage changes, is different than signature data of a television. In some implementations, the received signature data may be first compared to stored signature data for device types to determine a device type of the device. Once the device type is determined, additional comparisons may be performed to determine a device and/or a device state that matches the signature data. This additional comparison may be done because different devices of a device type may operate differently, have different device states, and generate different voltage signatures. For example, a dishwasher from manufacturer A may have a different startup state, and thus a different voltage signature for a startup state than a dishwasher from manufacturer B.

In addition to determining the device type, device, or device state represented by received signature data, the management system 320 also determines, based on the determined device type, device, or device state, whether one or more units of a consumable inventory type associated with the location was used. For example, the management system 320 may maintain a count of each consumable inventory type known to be at the location (inventory count), determine if one or more of those items is associated with the determined device type, device or device state and, if so, decrement the inventory count for that consumable inventory type. The management system may then determine, based on the consumable inventory count maintained in one or more data stores for the location, whether the consumable inventory type should be reordered. Such a determination may be based on the quantity of the consumable remaining or based on both the quantity remaining and a consumption rate determined for the location that indicates a rate at which the consumable inventory type is being used or depleted at the location.

In this example, it is determined that the consumable inventory type determined to have been consumed based on the detected device type, device, or device state should be reordered and a reorder recommendation is sent by the management device to the location for presentation to a user at the location. Alternatively, as discussed herein, in some implementations, the consumable may be automatically reordered and delivered to the location.

Figure 4A:
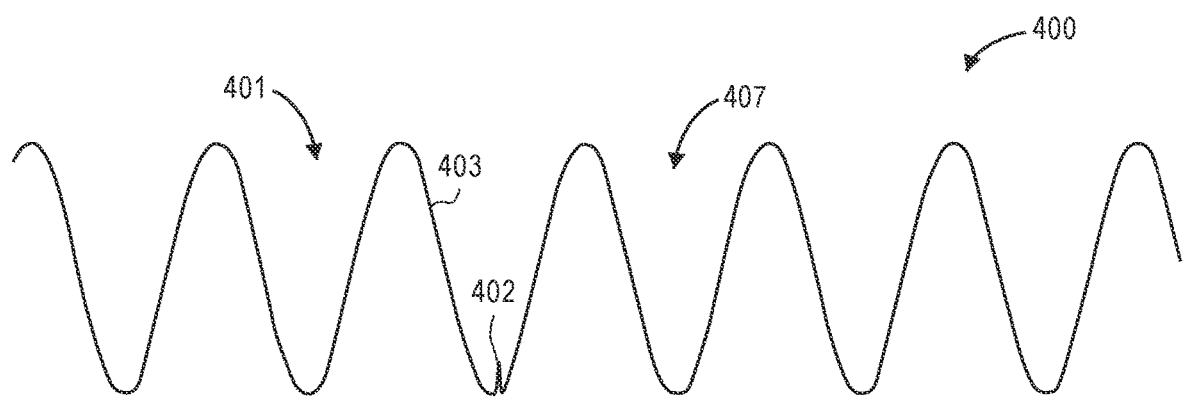
FIG. 4A illustrates an example voltage signal measurement over a period of time on the lead line of a circuit, in accordance with described implementations.
Figure 4B:
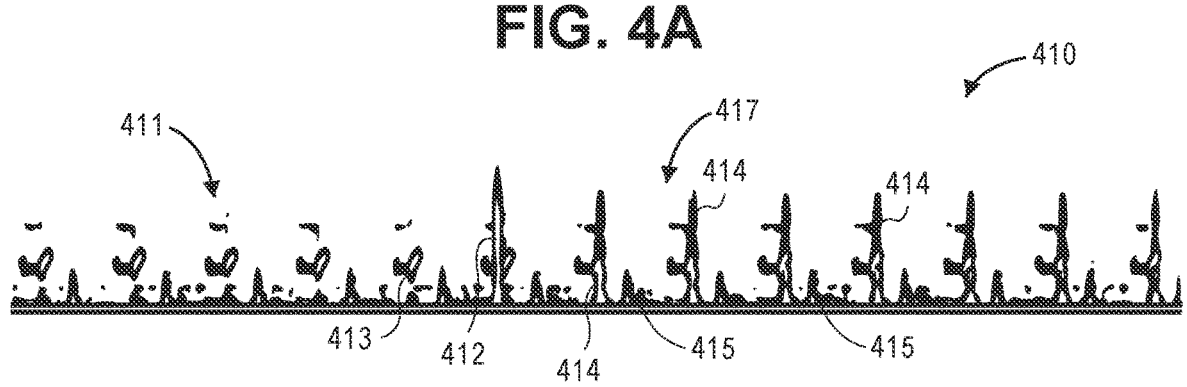
FIG. 4B illustrates an example spectrograph representation of the voltage signal of FIG. 4A, in accordance with described implementations.
Figure 4C:
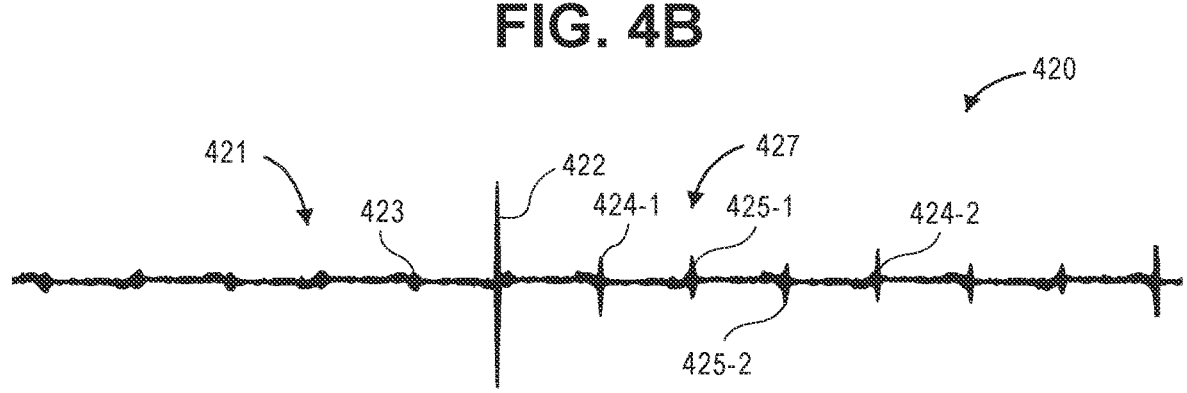
FIG. 4C illustrates an example voltage signal measurement over a period of time on the neutral line of a circuit, in accordance with described implementations.
Figure 4D:
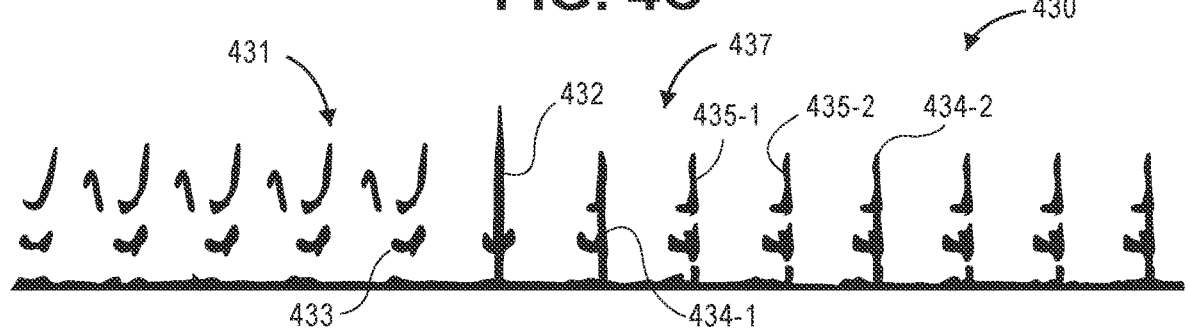
FIG. 4D illustrates an example spectrograph representation of the voltage signal of FIG. 4C, in accordance with described implementations.

FIGS. 4A through 4D illustrate example signatures that may be generated by a device during one or more device states of the device and used to identify the device and/or the device state, in accordance with described implementations. In this example, FIG. 4A illustrates an example voltage signal 400 measured over a period of time on the positive, hot, or lead line (generally referred to herein as the lead line) of a circuit, in accordance with described implementations. FIG. 4B illustrates an example spectrograph representation 410 of the voltage signal of FIG. 4A, in accordance with described implementations. FIG. 4C illustrates an example voltage signal 430 measurement over a period of time on the neutral line of a circuit, in accordance with described implementations. FIG. 4D illustrates an example spectrograph 440 representation of the voltage measurement of FIG. 4C, in accordance with described implementations. As discussed further below, in some implementations, in addition to or as an alternative to measuring signals on the lead line and the neutral line, signals on the ground line may be monitored and used as an input in determining an identity of an operating device.

As can be seen in each of the signals, during an initial time 401, 411, 421, 431, there are no devices operating and the voltage in this example is 120 volts at a sixty hertz frequency as illustrated by signals 403, 413, 423, 433. When a device, in this example Device A, is activated, an initial voltage increase is introduced into the signal, as represented by the peak 402 in the signal 400, the peak 412 in the spectrograph 410, the peak 422 in the signal 420, and the peak 432 in the spectrograph 430. The device continues to operate as illustrated by the portions 407, 417, 427, and 437 following the initial peak. In addition, the periodic nature of the voltage change may be utilized as the signature data for Device A. For example, looking at the spectrograph 417 of FIG. 4B periodic large peaks 414 and following smaller peaks 415 on the lead line have a distinct pattern during device operation. In a similar manner, the signal 420 measured on the neutral line illustrates periodic voltage peaks 424-1, 425-1, 424-2, and 425-2 that are introduced by operation of Device A. In addition, the amplitude of the peaks 424-1, 424-2 are separated by a pattern of two smaller amplitude peaks 425-1, 425-2. This cycle repeats during operation of Device A, thereby providing another portion of the signature data generated by Device A during operation. Finally referring to the spectrograph of the neutral line signal, the repeating patterns of two peaks 434-1 and 434-2 are separated by smaller peaks 435-1 and 435-2. In some implementations, signals on the ground line may also be measured by the plug-in-energy sensor. For example, the ground line with respect to a floating point, such as a smooth version of voltage, may be monitored for noise or voltage introduced to the ground line during device operation. Monitoring the ground line may be particularly beneficial in detecting operation of certain electronic devices that utilize a power supply that couples the capacitor bank to the ground line using a resistor or other coupling. Likewise, ground line monitoring may aid in the determination of device malfunction as many devices, as they begin to malfunction or lose efficiency, introduce an unexpected voltage on the ground line.

The different patterns of voltage changes on the measured lead line, neutral line, and/or ground line, as detected by the plug-in sensor, collectively provide signature data that is representative of an operation of Device A. As discussed herein, as the signature data is detected, the signature data can be compared to stored signature data to identify Device A.

Once Device A is determined from the signature it may be determined whether a consumable is associated with Device A for that location and, if so, a quantity of the inventory of the consumable decremented in response to determining that Device A has been operated at the location.

In addition to monitoring for signals indicating device operation, in some implementations, the plug-in sensors may actively model or determine the topology or characteristics of the electrical circuit at the location to which they are connected. By modeling the electrical circuit, the plug-in sensor or the remote management system may determine a baseline signal of the circuit at the location, determine behavior and responses to different loads when introduced to the circuit, etc. Such information increases the fidelity and accuracy of signal extraction and device detection.

Figure 5:
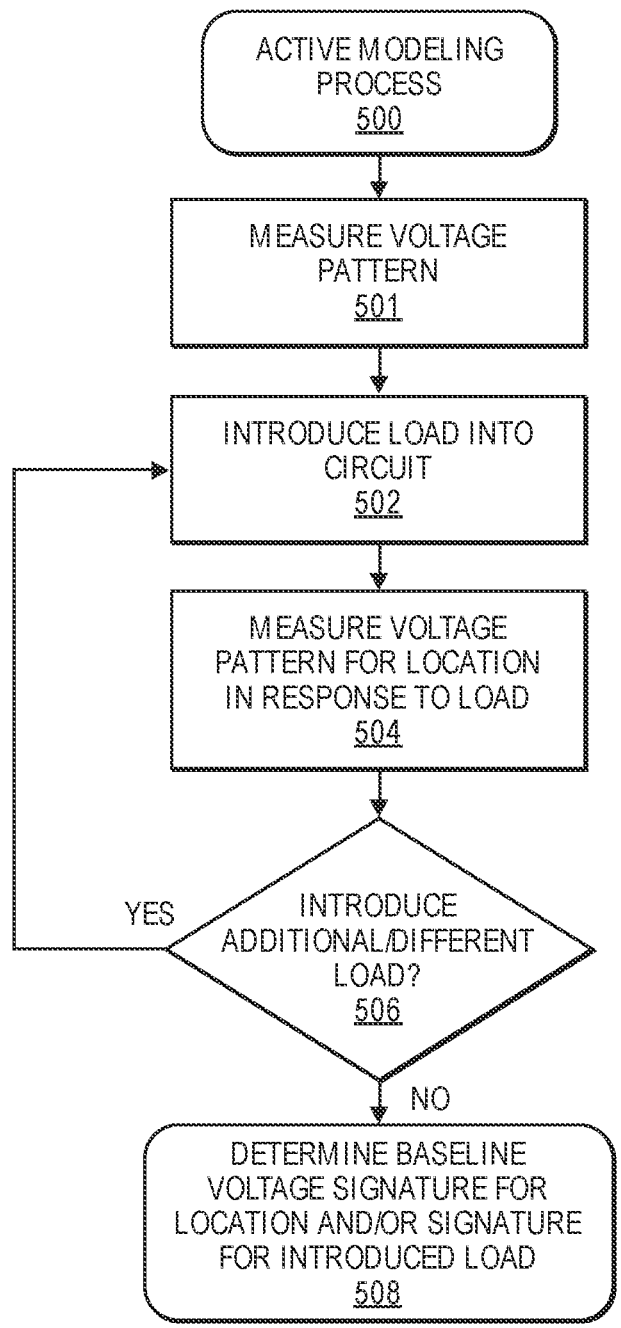
FIG. 5 is an example active modeling process, in accordance with described implementations.

FIG. 5 is an example active modeling process 500, in accordance with described implementations. The example process 500 may be performed when the plug-in sensor is first connected to a circuit, when power is detected by the plug-in sensor (e.g., after a power outage at the location), at periodic intervals, etc.

The example process 500 begins by the plug-in sensor measuring a voltage pattern present on the electrical circuit to which it is connected, as in 501. As discussed above, the voltage pattern may be measured on any one or more of the lead line, neutral line, and/or ground line.

In addition to measuring the voltage pattern, the example process 500 introduces a load into the circuit to which the plug-in sensor is connected, as in 502. Different loads may be introduced at different times to measure the differences of those introduced loads—i.e., the signals produced on the electrical circuit in response to the different introduced loads. As discussed further below, in some implementations, in addition to introducing a load to determine baseline characteristics, introduced loads will produce different measured signals based on what other devices are currently operating. For example, an introduced load will produce a different signal when a washing machine is in a spin cycle compared to when the washing machine if turned off. Introduced loads may be, for example but not limitation, resistive loads, inductive loads, capacitive loads, etc.

As the load is introduced into the circuit, the voltage pattern at the location is measured between the time the load is introduced until introduction of the load terminates, as in 504. The duration of load introduction may be any time interval, such as 3 seconds. As discussed, the voltage pattern may be measured on one or more of the lead line, neutral line, and/or ground line and each of those measurements may be used alone or in combination to produce a signal representative of the introduced load produced on the electrical circuit under the current operating conditions of devices on the electrical circuit.

After measuring the voltage pattern produced in response to the introduced load, a determination is made as to whether an additional and/or different load is to be introduced into the circuit by the plug-in sensor, as in 506. In some implementations, multiple different loads may be introduced in parallel or in series by the plug-in sensor so that the different responses to the different types of loads can be measured.

If it is determined that an additional and/or different load is to be introduced, the example process 500 returns to block 502 and continues. However, if it is determined that no additional and/or different loads are to be introduced, a baseline voltage signature data is determined for the location and/or a signature data representative of the introduced load at the location and under the current conditions is determined, as in 508. The baseline voltage may be determined by subtracting out each of the measured signals resulting from the different introduced loads and the remaining signals identified as the baseline signal. This may be done for one or more of the lead line, neutral line, and/or ground line and the baseline signature data may be considered to include one or more of those signatures. Likewise, the signature data for the introduced load may be determined by removing the voltage pattern measured at block 501 before the load was introduced, and producing signature data from the remaining voltage pattern that was produced in response to the introduction of the load into the electrical circuit.

In some implementations, the example process 500 may be performed at different times when it is known that different devices are operating at the location so that different signature data produced in response to an introduced load can be determined and associated with those devices and/or particular device states of those devices. For example, a resistive load may be periodically introduced into the electrical circuit and the resultant signature data determined at different times when different devices are known to be in different operating states. The resultant signature data may then be associated with those devices and/or device states. At a later time, when device detection is being performed, the resistive load may be introduced into the electrical circuit and the resultant signature data compared to load signature data determined under different device operating conditions/states. Those comparisons may be used as inputs in device identification and detection and/or determination of device state.

Figure 6:
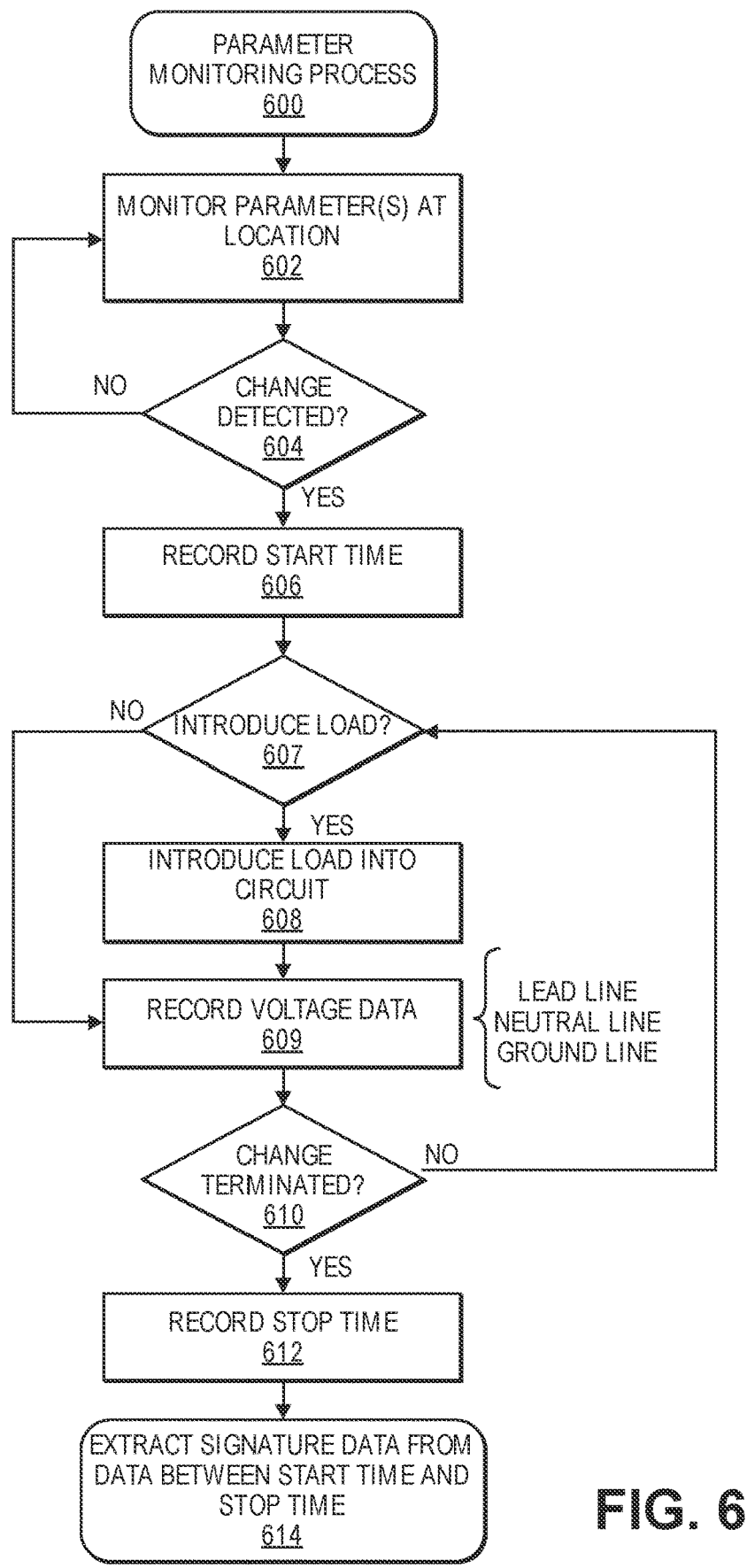
FIG. 6 illustrates an example parameter monitoring process, in accordance with described implementations.

FIG. 6 illustrates an example parameter monitoring process 600, in accordance with described implementations. The example process begins by monitoring one or more parameters (e.g., voltage, current, acoustics, RF field interference) for a change at a location, as in 602. In some implementations, the parameters may be monitored on an electrical circuit at the location, for example, through use of a plug-in sensor that is connected to the electrical circuit at an outlet of the electrical circuit. As discussed above, a known or baseline voltage signature data (e.g., 120 V at 60 Hz) may be known for a location and monitored for deviations over a period of time. A variety of techniques may be utilized to determine changes including, but not limited to, monitoring for changes in amplitude, spectral changes, and/or waveform or wave shape changes. In some implementations, the changes may be monitored on a time basis to detect changes over a period of time (e.g., comparing To with ti, etc.). For voltage changes, the voltage change may be monitored on any one or more of the lead line with respect to ground, the neutral line with respect to ground, or the ground line with respect to a reference, such as a smooth voltage waveform.

As the parameter(s) at the location is monitored, a determination is made as to whether a change in one or more parameters is detected, as in 604. If no change is detected, the example process 600 returns to block 602 and continues. However, if a change is detected, a start time of the detected change is recorded, as in 606. A start time may be any identifier or marker indicating a time at which the parameter change at the location is detected. In some implementations, the plug-in sensor may be synchronized with a timing clock, such as a clock signal transmitted over a wireless network at the location. In such an example, the start time may be a time determined from the clock signal when the parameter change is detected.

In some implementations, a determination may also be made as to whether one or more loads are to be introduced into the circuit while the device is operating, as in 607. As discussed above, introducing a known load into the circuit during device operation will produce different resultant signals based on the device and/or the device state of the device, which may aid in identifying the device and/or the device state of the device. For example, a resistive load introduced into the circuit during the spin cycle of a washing machine (a device state) will produce a different resultant signal compared to introduction of the same resistive load during the fill cycle of the washing machine (another device state), or when the washing machine is off (another device state). If it is determined that a load is to be introduced into the circuit during the device operation, the load is selected and introduced into the circuit for a defined period of time (e.g., three seconds), as in 608.

During and subsequent to introduction of the load into the circuit, or if it is determined that no load is to be introduced into the circuit, voltage data from one or more of the lead line, the neutral line, and/or the ground line, is recorded, as in 609. In some implementations, all voltage data may be recorded to memory. In other implementations, the voltage data may be processed as it is received to remove the baseline voltage signature data and/or introduced load voltage signature data, such that only the signature data generated by the change in voltage due to device operation remains, and that change recorded. In still other examples, the voltage data may be periodically sampled and those samples, or the change voltage represented in those samples, recorded. For example, samples of the voltage data may be obtained once per second and introduced load signature data and/or signature data produced by the operation of the device determined from the samples.

As parameter data is recorded, a determination is made as to whether the change in the parameter has terminated, as in 610. Determining whether the change in one or more parameters has terminated may be done for a period of time before it is confirmed that the change has terminated. For example, some device states may generate signature data in which there is no additional voltage at periodic intervals, e.g., during the open/close of relay switches of the device, but the device is still in the same device state. By confirming that there is no voltage change for a defined period of time, e.g., five seconds, it may be confirmed whether the device has changed device states.

If it is determined that the parameter change has not terminated, the example process 600 returns to block 607 and continues. However, once the device state changes, the parameter change will terminate or change, and the transition will be detected by the example process 600. When it is determined that the parameter change has transitioned, a stop time indicating the change is recorded, as in 612.

Finally, the recorded data between the start time and the stop time is processed to extract the signature data of the device and/or signature data resultant from introduced loads, as in 614. As discussed, in some implementations, the signature data may be extracted by subtracting out the baseline voltage signature data and this may be done on one or more of the lead line, the neutral line, or the ground line. Additionally, or as an alternative thereto, the signature data resulting from device operation or device state may be determined based on an increase in amplitude of the signal during the period of time, based on a spectral analysis of the recorded data, and/or based on wave shape or waveform analysis of the recorded data. Likewise, the signature data produced from an introduced load may be predictable based on the load that was introduced.

Figure 7:
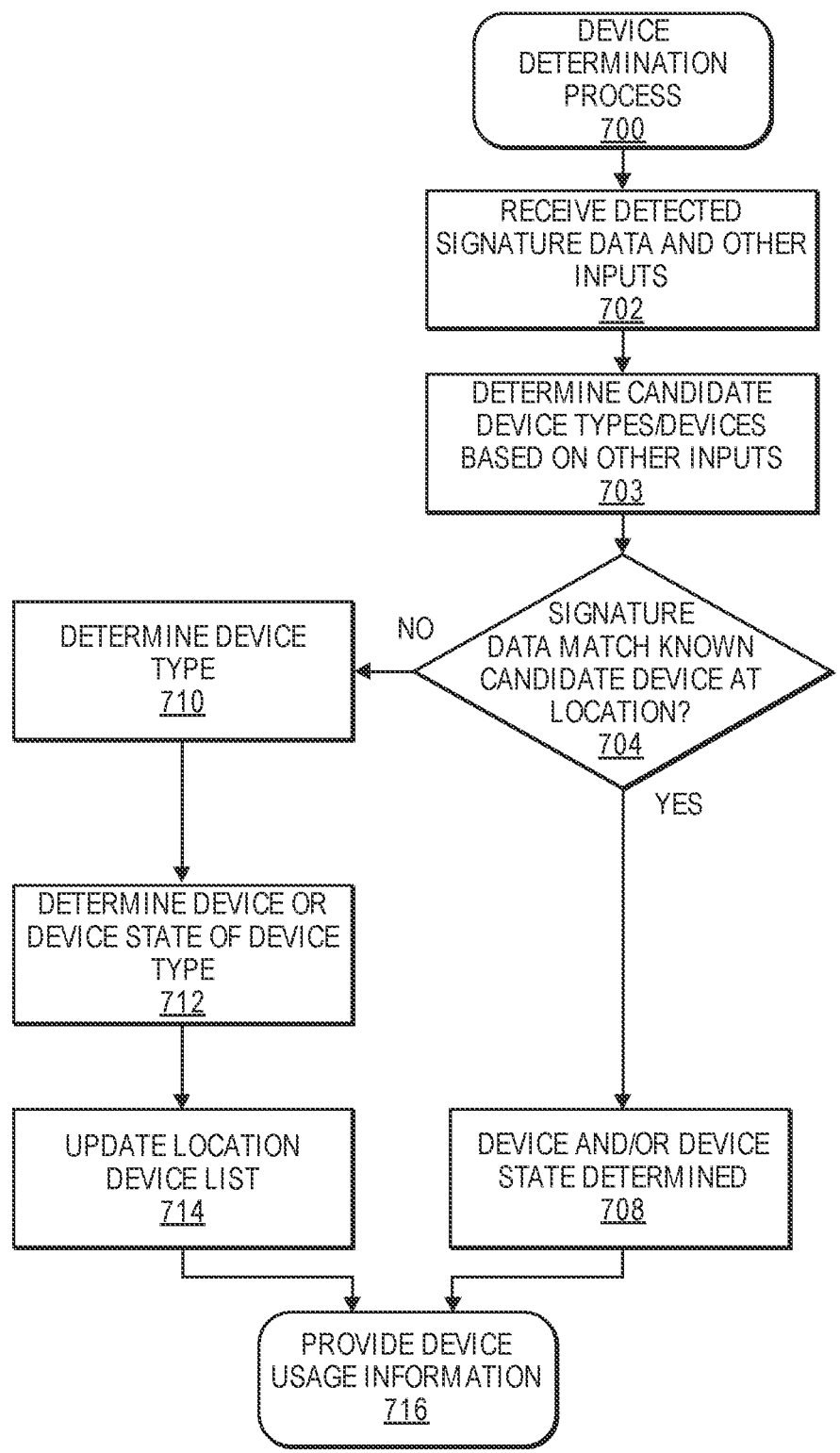
FIG. 7 illustrates an example device determination process, in accordance with described implementations.

FIG. 7 illustrates an example device determination process 700, in accordance with described implementations. The example process 700 may be performed at the plug-in sensor, at a communication hub or communication component at the location, at the remote management system, or portions of the example process 700 may be performed at different locations and/or by different devices.

The example process 700 begins upon receipt of a detected signature data, and optionally, other inputs, as in 702. Other inputs may include, but are not limited to, signature data detected from one or more loads introduced into the circuit by the plug-in sensor and/or another plug-in sensor, during operation of the device, data from the operating device and/or other devices or sensors at the location, energy usage information, etc. For example, other devices at the location may provide data indicating presence of users at the location, changes in environment conditions at the location (e.g., lighting changes resulting from the on/off of a light at the location, temperature changes), etc. In still other examples, other inputs may include the time of day and predictive modeling that has been developed for the location over a period of time to predict candidate devices that may be operating and/or the device state of those devices.

If other inputs are received, those inputs may be used to determine candidate device types and/or candidate devices that may have been operating or confirmed to not be operating at the location, as in 703. As inputs are collected and associated with identified devices, those inputs may be used as data points to determine candidate device types or candidate devices for consideration in device identification and/or device state determination.

Once candidate devices are determined, the signature data is compared with signature data of those known candidate devices and/or signature data of different device states of those known candidate devices to determine if there is a match between the received signature data and signature data of a known candidate device or device state of a known candidate device at the location, as in 704. In some implementations, each time the example process 700 is performed, and a new device or device state identified for a location, the device and/or device state and corresponding signature data may be added to a location datastore that identifies devices and/or device states and corresponding signature data for the location. Then, when the example process 700 is performed in the future, it may first compare a received signature data with signature data of devices and/or device states of devices known to be at the location, thereby reducing processing time and compute requirements and increasing accuracy of device identification and/or device state determination for the location. In addition, in some implementations, the identity of the identified device and/or device state and corresponding signature data may be provided to the remote management system and added to the device signature data store for the device/device state and aggregated with signature data of other locations for use in future identification of devices and/or device states at various locations.

If it is determined that the signature data matches signature data of a candidate device known to be at the location and/or a device state of a candidate device known to be at the location, the device and/or device state is determined, as in 708. However, if it is determined that the signature data does not match stored signature data of a candidate device known to be at the location and/or a device state of a candidate device known to be at the location, additional processing of the signature data is performed to determine a device type corresponding to the signature data, as in 710. Additional processing may include comparing the signature data to different signature data profiles for different device types and/or processing segments of the signature data to identify markers in the signature data that correspond with markers of different device types. For example, signatures of all brands of microwave ovens may include markers that are common or similar. For example, all brands of microwave ovens may have an initial voltage increase at power on (a device state), a second voltage increase when rotation of the turntable is activated (another device state), and a third voltage increase when the magnetron of the microwave is energized (another device state). While these voltage increases and device states may be different for different brands of microwaves, the pattern or relationship between the state changes may be similar, thereby generating markers for all brands of microwaves that may be utilized to initially classify signature data by device type (e.g., microwave).

Upon determination of the device type, the signature data may then be compared to stored signature data of devices of that device type to determine the specific device and/or device state(s) that generated the received signature data, as in 712. Similar to comparing the received signature data with stored signature data of candidate devices known to be at the location and/or device states of candidate devices known to be at the location, to determine a device of the device type, the received signature data is compared with signature data of devices or device states of devices of the device type to determine the stored signature data that has a highest similarity to the received signature data. In some implementations, a confidence level may be determined and if it cannot be determined with a high enough degree of confidence, a notification may be sent to the location that identifies the device or devices that have been determined to have similar signature data, along with a request for device confirmation. In such an example, the potential devices may be indicated to a user at the location and the user may select or specify the correct device. Once the device and/or device state has been determined, the location device list may be updated to include the device and/or device state and the signature data corresponding to that device/device state, as in 714.

Upon determining the device or device state, device usage information may be generated or provided for use in determining if a consumable inventory count should be decremented, as in 716. Device usage information may indicate the device, device type, device state, duration of operation of the device, etc.

As noted above, some or all of the example process 700 may be performed at the plug-in sensor, some or all of the example process 700 may be performed by the communication hub or the communication component, and/or some or all of the example process 700 may be performed by the remote management system. For example, the plug-in sensor and/or the communication hub/component may maintain, in memory, signature data for devices known to be at the location and/or device states of devices known to be at the location and may perform blocks 700 through 708. However, if the signature data is not matched with signature data of a known device/device state, the signature data may be sent via a network to the management system and the management system may perform steps 710 through 714 to determine the device and/or device state represented by the signature data.

Figure 8:
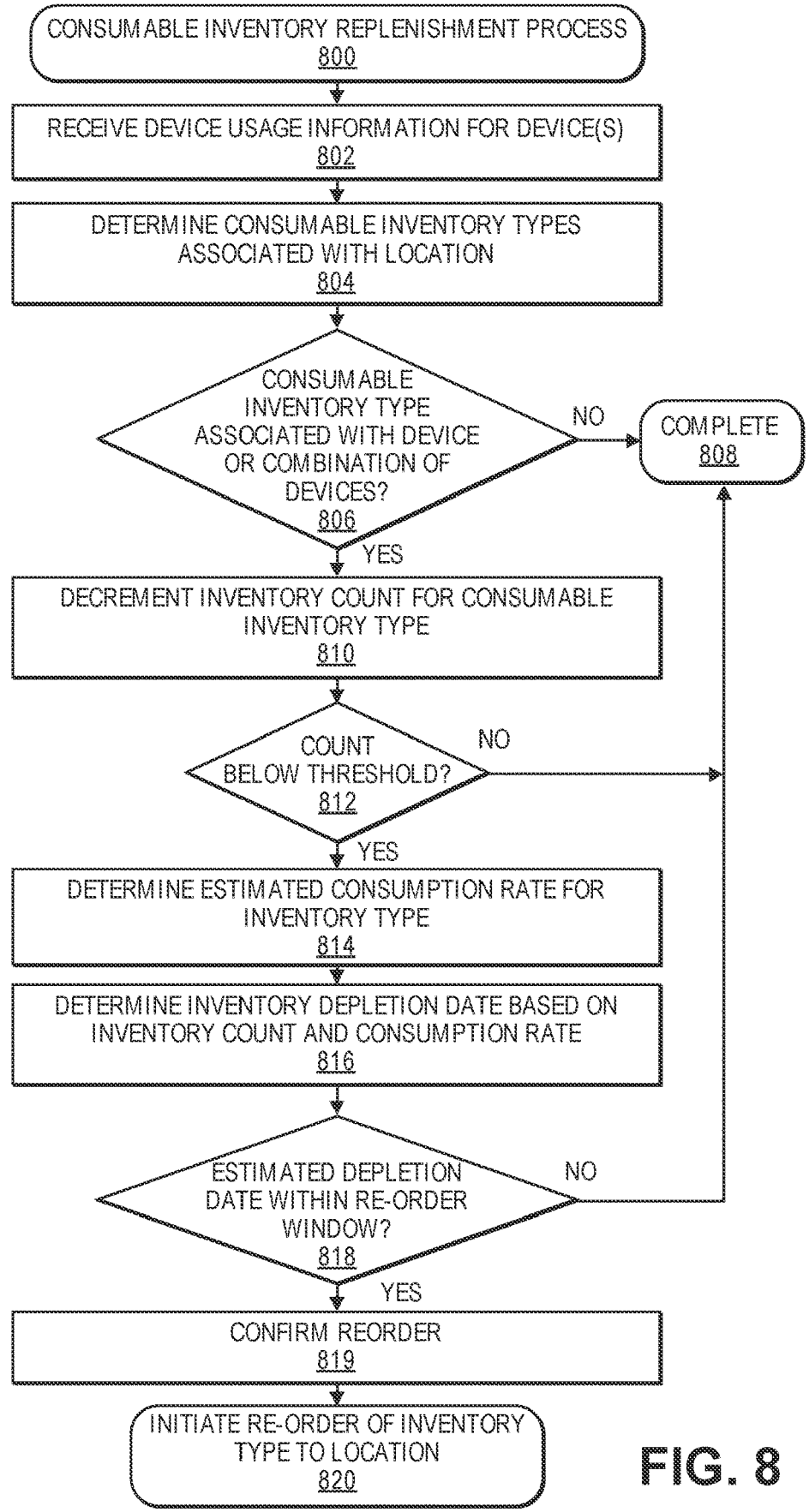
FIG. 8 illustrates an example consumable inventory replenishment process, in accordance with described implementations.

FIG. 8 illustrates an example consumable inventory replenishment process 800, in accordance with described implementations. The example process 800 begins upon receipt of device usage information, as in 802. As discussed above with respect to FIG. 7, device usage may include, but is not limited to, an indication or identification of a device, device type, device state, duration of operation of the device, etc. In some implementations, device information for more than one device may be received, indicating a series of devices that have been determined to be in operation at the same time, near a same time, or in a sequence. For example, a series of devices for which device information may be received may be any devices determined to have operated at the location during a five minute window with another device. As one example, a series of device information may include an indication that the light the freezer illuminated for a fifteen second period, as represented by one set of device information, followed two minutes later by a four minute operation of a toaster oven, as represented by a second set of device information.

In addition to receiving device information for one or more devices, the example process 800 may also determine consumable inventory types associated with the location from which the device information was received, as in 804. As discussed above, one or more users may opt-in or select to share purchase information with the described implementations and/or may provide information regarding consumable inventory type that may be maintained and monitored by the disclosed implementations. Regardless of the source of the consumable inventory types associated with the location, such information may be maintained in a data store and retrieved or otherwise accessed by the example process 800.

Based on the device information and the consumable inventory types, a determination is made as to whether one or more of the consumable inventory types is associated with the device, device state, combination of devices, sequences of device operation, combination of device states, or sequence of device states for which the device information was received, as in 806. For example, if device information is received for a single device, it may be determined whether there is consumable inventory type associated with the location that corresponds with that device type. As illustrated in Table 1 above, a consumable inventory type of coffee pods may be associated with the single device of a coffee maker. As will be appreciated, more than one consumable inventory type may be associated with a single device type. For example, as illustrated in Table 1, both consumable inventory types of coffee grounds and coffee filters may be associated with the device coffee maker. Likewise, in some implementations, the consumable inventory item associated with a device may not be actually consumed by that device, but a correlation may exist in which the consumable inventory item is consumed when the device operates. For example, it may be determined that after every three uses of a treadmill (device) at the location, a unit of laundry detergent is consumed by the user at a laundromat.

In other implementations, if device information for a sequence of devices or multiple devices are received, it may be determined whether there are one or more consumable inventory types associated with the location that corresponds with the sequence or multiple devices. In some implementations, a consumable inventory type may only be associated with a plurality of devices when those devices are determined to have operated in a particular sequence. For example, as illustrated in Table 1 above, the consumable inventory type "frozen waffle," may be associated with the combination of device information that indicates the freezer light operating and the toaster operating, but only when they operate in the sequence of the freezer light operating first followed within a defined period of time (e.g., five minutes) by device information indicating toaster operation. In other examples, such as the consumable inventory type of coffee creamer, the order of operation of the devices may not matter provided that each device was determined to have operated within a defined period of time of each other. In still other examples, some consumable inventory types may only be associated with particular operation states or patterns of a device. For example, the consumable inventory type of popcorn may only be associated with device information indicating a particular pattern of operation (device states) of a microwave.

Device states, device patterns, device combinations, device sequences, etc., and corresponding consumable inventory types may be defined by a user at the location, learned over a period of time based on operation of devices and determined consumable inventory type consumption, etc. In some implementations, device information and consumable inventory type usage patterns may be aggregated from multiple locations and used to determine device, device combinations, device patterns, device sequences, etc., indicative of a usage of one or more consumable inventory types. Such information may be utilized by the example process 800 to determine if a consumable inventory type is associated with the device or combination of devices.

Returning to FIG. 8, if it is determined that no consumable inventory type is associated with the determined device or combination/sequence of devices, the example process completes, as in 808. However, if it is determined that a consumable inventory type is associated with the determined device or combination/sequence of devices, an inventory count for the determined consumable inventory type, or consumable inventory types, is decremented, as in 810. As discussed herein, a starting and current inventory quantity for each consumable inventory type associated with a location may be maintained and accessible by the example process 800. The starting inventory may be provided directly by a user, obtained from purchase history to which the user has allowed access, etc. Likewise, at any time, the user may update the current inventory count for any consumable inventory type associated with the location and/or indicate an additional consumable inventory type, starting quantity, and/or devices that cause consumption of the consumable inventory type for which the example process 800 is to monitor and replenish inventory.

After decrementing the inventory count for the determined inventory item, a determination is made as to whether the inventory count for the consumable inventory type has reached or is below a threshold, as in 812. The threshold may be any number, percentage or other indicator corresponding to a depletion of the consumable inventory type. The threshold may be different for different consumable inventory types, different locations, different users, etc. Likewise, the threshold may be defined or set by a user.

If the inventory count is not below a threshold, the example process 800 completes, as in 808. If the inventory count does meet or is below the threshold, a consumption rate may be determined for the consumable inventory type, as in 814. The consumption rate may be determined, for example, based on the average period of time between each consumption of consumable inventory types. For example, a first time may be associated with a starting inventory count of a consumable inventory type and a second time may be associated with a current inventory type. The consumption rate may be the difference between the starting inventory count and the current inventory count divided by the duration of time between the first time and the second time. As one example, if the starting inventory count at the first time was fifty-five, and the current inventory count of five at a second time which is one-hundred days from the first time, the consumption rate would be one unit every two days.

Based on the consumption rate, an estimated inventory depletion date at which the consumable inventory type is estimated to be completed depleted at the location is determined, as in 816. Continuing with the above example, if there are five units of inventory remaining and the consumption rate is one unit ever two days, the estimated inventory depletion date will be in ten days.

Based on the estimated depletion date, a determination date is made as to whether the estimated depletion date is within a re-order window for that consumable inventory type, as in 818. The re-order window indicates an approximate or average delivery time for fulfillment of a particular consumable inventory type to the location. As such, each consumable inventory type for each location may be assigned its own re-order window. For example, some consumable inventory types, such as coffee pods, may be available for same day or next day delivery to the location and would have a re-order window of one day. In comparison, some other consumable inventory types may have an average delivery time to the location of three to five days. In such an instance, the consumable inventory type may be assigned a re-order window of three-five days. The re-order window may vary depending on both the consumable inventory type and the location to which the consumable inventory type is to be delivered.

In some implementations, rather than or in addition to determining depletion date, one or more weighted minimization scores may be determined. A weighted minimization score may be determined based on one or more delivery characteristics. For example, some characteristics such as delivery by a defined delivery date, penalty for oversupply at the location, no overnight delivery, etc., may be assigned different weightings or penalties when determining a weighted minimization score.

If it is determined that the estimated depletion date for the consumable inventory type is not within the re-order window and/or that the weighted minimization score is not sufficient, the example process completes, as in 808. In some implementations, even though a re-order is not yet necessary, the example process 800 may notify the user that the inventory count for the consumable inventory type is becoming depleted and when it is estimated that a re-order will be necessary.

If it is determined that the estimated depletion date for the consumable inventory type is within the re-order window and/or that a re-order should be initiated based on a weighted minimization score, a re-order of the consumable inventory type is confirmed, as in 819. Confirming a re-order of the consumable inventory type may vary based on the user preference. For example, in some implementations, a user may prefer to be notified of the consumable inventory type depletion and the user may initiate the re-order. While, in other implementations, the user may select to have the item automatically re-ordered and delivered to the location when it is determined that the inventory count has been depleted to a threshold level and the estimated depletion date is within the re-order window. An example re-order confirmation interface is discussed further below with respect to FIG. 10.

Upon confirming re-order of the consumable inventory type, the re-order of that consumable inventory type is initiated, as in 820. Initiation of the re-order may include, but is not limited to, placing an order with the e-commerce website to purchase and have the order delivered to the location prior to the consumable inventory type being fully depleted. In some implementations, the re-order window may be set so that the consumable inventory type can be delivered using a lowest cost method of fulfillment. In other implementations, or if the re-order is not placed during the re-order window, other forms of fulfillment may be utilized so that the consumable inventory type is replenished at the location before the current inventory is fully depleted.

Figure 9:
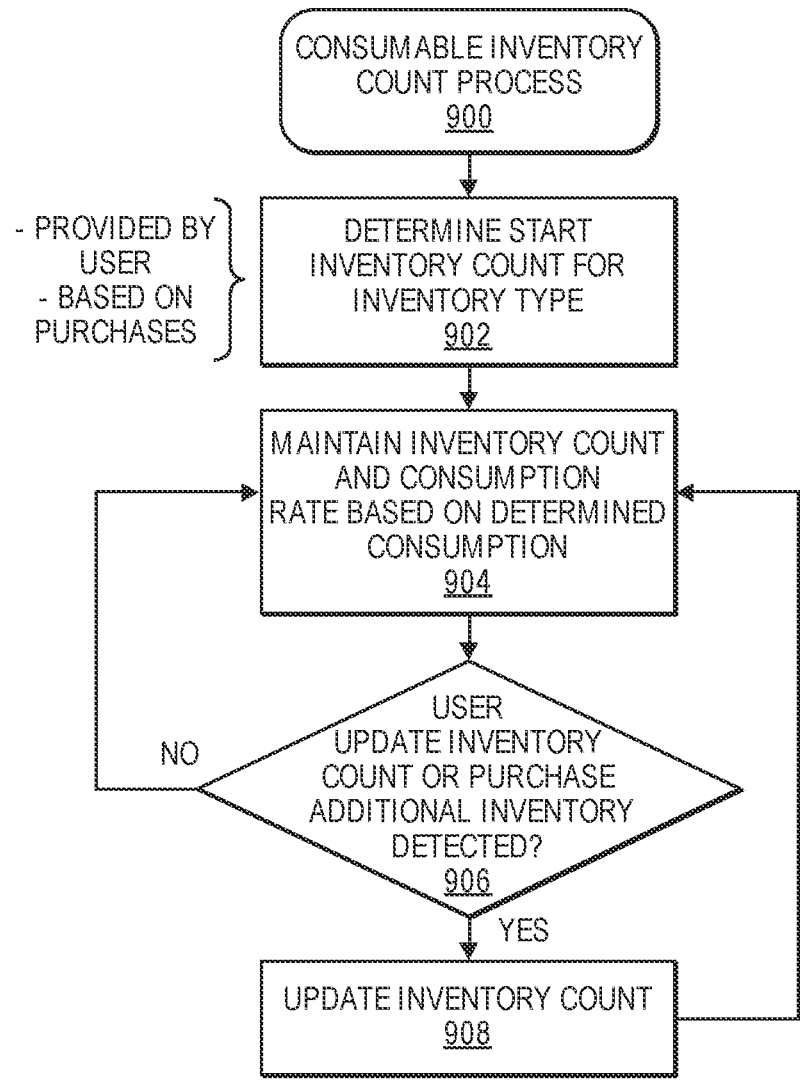
FIG. 9 illustrates an example consumable inventory count process, in accordance with described implementations.

FIG. 9 illustrates an example consumable inventory count process 900, in accordance with described implementations. The example process 900 may be performed in conjunction with the example process 800 to maintain an inventory count for each consumable inventory type at a location. The example process 900 begins by determining a starting inventory count for a consumable inventory type at the location, as in 902. As discussed, a user may affirmatively provide the starting inventory count for the inventory item. Alternatively, a user may select to allow the example process 900 to obtain purchase information corresponding to the user or the location, for example purchase information from an e-commerce website that fulfills consumable inventory types to the location, and the example process may determine the starting inventory count for the consumable inventory type based on the purchase information. In some implementations, the user may be able to selectively specify which purchase information is available or accessible to the example process 900. In such an example, the user may select to only share specific purchases, select to only share purchase information corresponding to consumable inventory types, etc.

Upon determining a starting inventory count for the consumable inventory type, the example process 900 maintains the inventory count and a consumption rate for the consumable inventory type based on determined usage of units of the consumable inventory type, as in 904. Determined usage of a unit of a consumable inventory type is discussed above.

As the inventory count is maintained, a determination is made was to whether the user has provided an update to the current inventory count for the consumable inventory type and/or whether a purchase of additional inventory of the consumable inventory type has been detected, as in 906. For example, referring to FIG. 10, when a user is presented with a re-order confirmation, the user may adjust the current inventory count or select to re-order the consumable inventory type. Either of those will be detected by the example process 900 (FIG. 9) and the current inventory count for the consumable inventory type adjusted accordingly.

If it is determined that the user has provided an update to the current inventory count and/or a re-order of the consumable inventory type has been detected, the current inventory count for the consumable inventory type is updated, as in 908. After updating the inventory count in block 908, or if it is determined that no changes have been detected at decision block 906, the example process 900 returns to block 904 and continues.

Figure 10:
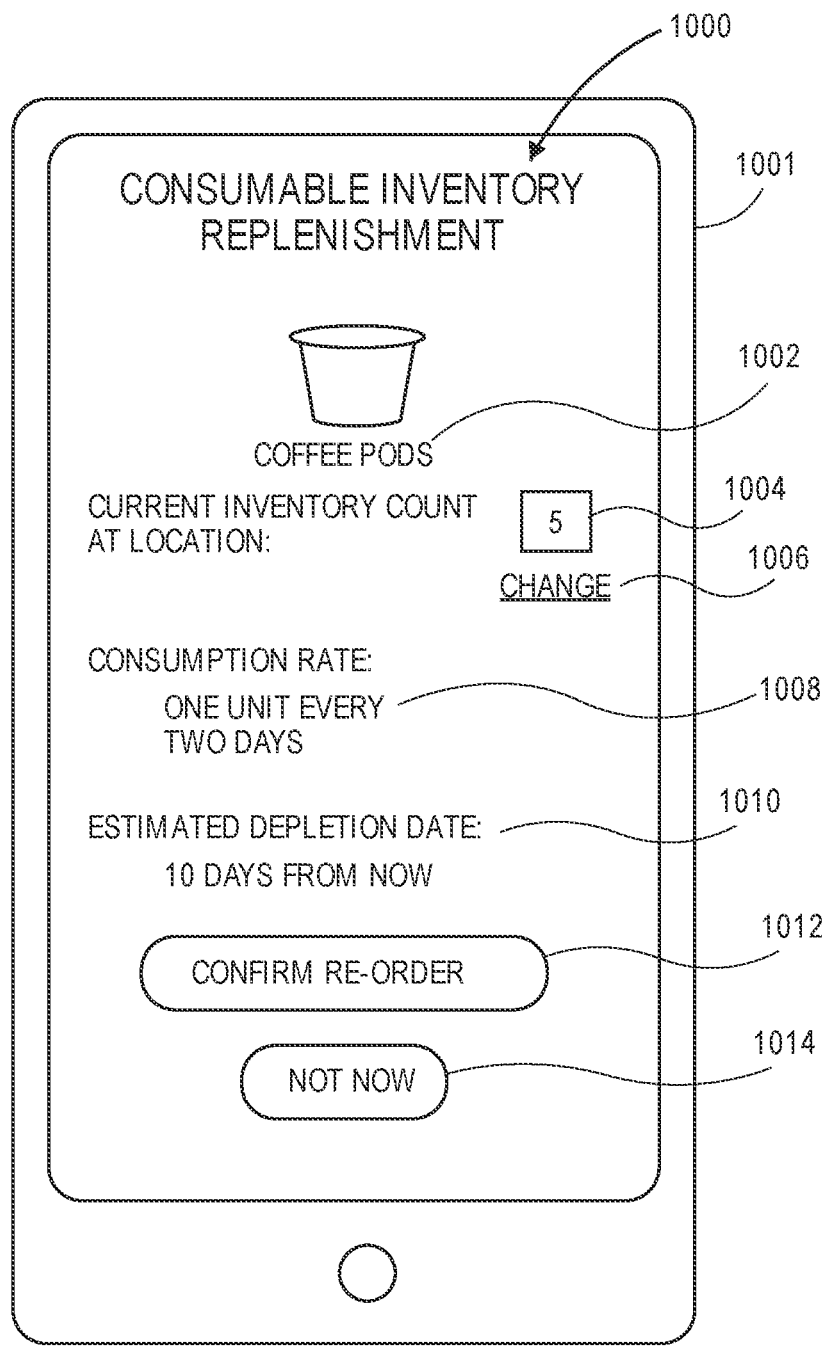
FIG. 10 illustrates an example consumable inventory replenishment user interface, in accordance with described implementations.

FIG. 10 illustrates an example consumable inventory replenishment user interface 1000, in accordance with described implementations. As discussed above, the user interface 1000 may be sent for presentation to a user upon determination that a consumable inventory type has been depleted below a threshold level and is within a re-order window. While the example discussed with respect to FIG. 10 illustrates a visual replenishment confirmation user interface, the described implementations are equally applicable using other modes of communication. For example, a user may be audibly notified of a request to re-order a consumable inventory type and may audibly accept or decline the request, adjust the inventory count for the consumable inventory type, etc. In other implementations, the consumable inventory type may be added to an e-commerce shopping cart of the user for the user to select and re-order at their convenience. In still another example, a user may receive a message, such as a text message, requesting re-order confirmation.

In the example illustrated in FIG. 10, the user interface 1000 is presented on a display of a portable device 1001, such as a smart phone, tablet, laptop, etc. The user interface 1000 indicates the consumable inventory type 1002 for which replenishment is requested. The user interface may also indicate a current inventory count 1004 for the consumable inventory type. In this example, the current inventory count for the consumable inventory type is five. A user interacting with the user interface may select the change control 1006 and alter the current inventory count if the count determined by the disclosed implementations is incorrect. In such an example, the example process 900 will detect the change in the current inventory count and adjust accordingly.

The user interface 1000 may also indicate a consumption rate 1008 for the consumable inventory type. Continuing with the above example, in this instance, the user interface indicates that the consumption rate 1008 for the consumable inventory type 1002 is one unit ever two days.

The user interface 1000 may also indicate an estimated depletion date 1010 for the consumable inventory type. Continuing with the above example, in this instance, the user interface indicates that the estimated depletion date 1010 is ten days from now. In other examples, the estimated depletion date may indicate a specific date or time.

In addition to providing information about the consumable inventory type, the example process may also include a "Confirm Re-Order" control 1012 that, when selected by the user, will cause a re-order of the consumable inventory type to be placed such that the order of the consumable inventory type is delivered to the location. Alternatively, the user may select the "Not Now" control 1014 to decline the request to re-order the item. If the user declines to re-order the consumable inventory type, the re-order confirmation request may be presented to the user again at a later time (e.g., when the user consumes another unit of the consumable inventory type) or it may be removed, and the user not reminded.

Figure 11:
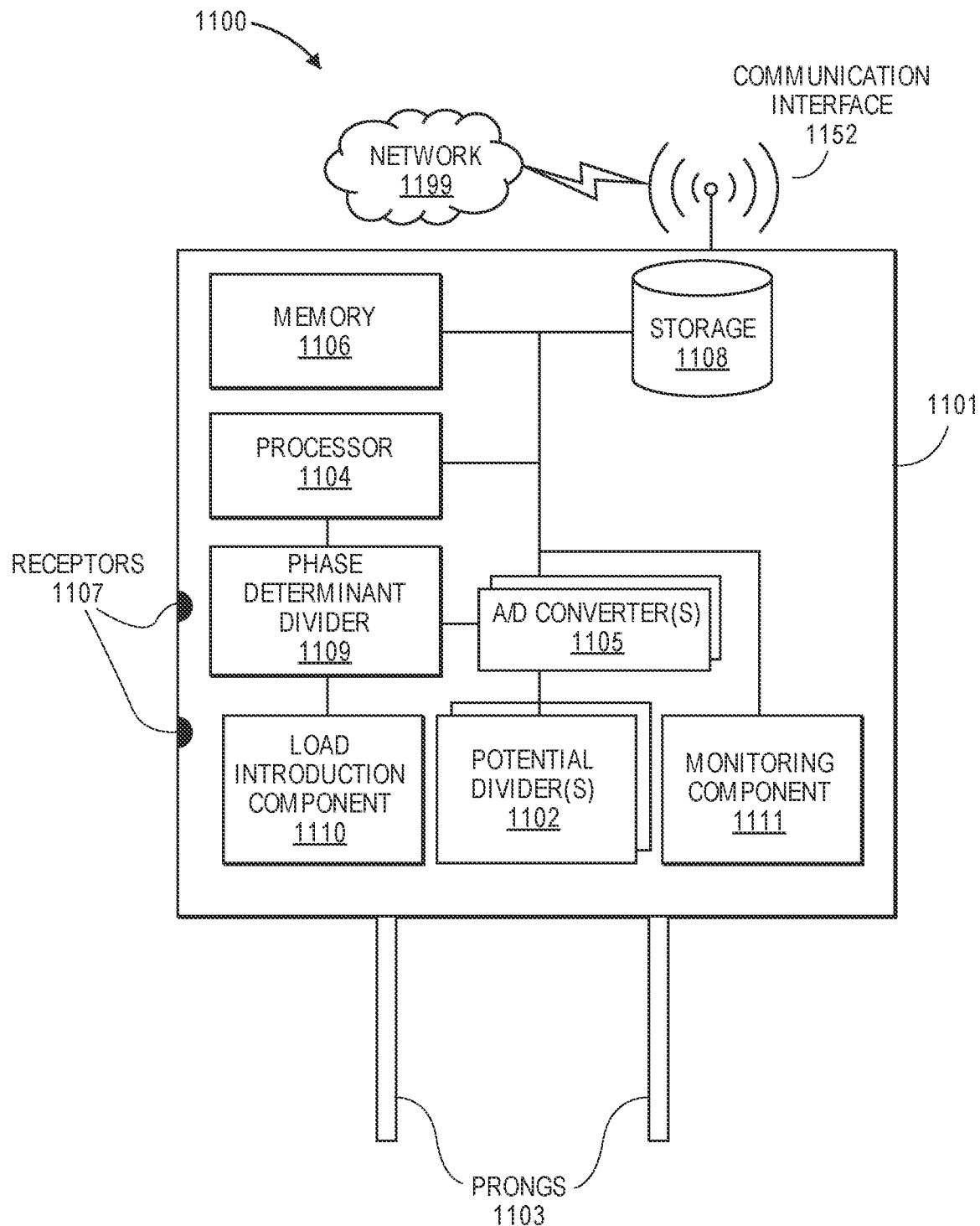
FIG. 11 illustrates example components of a plug-in sensor, in accordance with described implementations.

FIG. 11 illustrates example components of a plug-in sensor 1100, in accordance with described implementations. In implementations, the plug-in sensor 1100 is configured to be installed into an electrical outlet to interact with an electrical circuit at the location. As such, the plug-in sensor will include an insulating housing 1101, such as a plastic body or shell. In some implementations, the housing 1101 will be in the form of a cube such that the plug-in sensor has an appearance of a charger or other common electrical component. Protruding from the housing is at least one prong 1103. In most instances, as illustrated in FIG. 11, there are two prongs 1103 extending from the housing. In some implementations, there may be a third prong, or ground. The prongs interface with the electrical circuit at the location and enable the plug-in sensor to monitor voltage at the location, transmit codes, and/or introduce loads into the circuit at the location. For example, the prongs may be inserted into a common electrical outlet at the location.

Coupled to the prongs 1103 are one or more potential dividers 1102, such as voltage dividers. In some implementations there are three potential dividers, one for voltage measured from the lead line, one for voltage measured from the neutral line, and one for voltage measured from the ground line. In other implementations, there may be additional or fewer potential dividers. The potential dividers 1102 convert a high voltage, such as 120 volts, of the electrical circuit at the location into a lower voltage that can be recorded and analyzed at high frequencies (e.g., 200 kilohertz).

The one or more potential dividers may be coupled to one or more analog-to-digital converters 1105. The analog-to-digital converters receive the high frequency sampling produced by the one or more potential dividers 1102 and convert the analog signal to digital data, referred to herein as voltage data. The voltage data may be stored to memory, such as a random access memory ("RAM"), flash memory, or other form of permanent or temporary storage 1108. Any form of memory may be used with the disclosed implementations.

The prongs 1103 may also be coupled to a load introduction component 1110, a code transmitter component 1112, a phase determinant divider 1109, and/or a monitoring component 1111. The load introduction component may be operable to introduce one or more loads into the electrical circuit to which the plug-in sensor is coupled. For example, the load introduction component may be operable to introduce any one or more of a resistive load, an inductive load, or a capacitive load into the electrical circuit. The code transmitter component may be operable to transmit one or more codes that may be detectable by other plug-in sensors and/or communication components at the location to determine if two or more plug-in sensors are on the same phase of the electrical circuit at the location. The phase determinant divider may be configured to determine the phase or current on the electrical circuit to which the plug-in sensor 1100 is connected. Likewise, the monitoring component may be configured to monitor voltage patterns on the electrical circuit and/or detect codes transmitted from other plug-in sensors.

As discussed above, the monitoring component may include components that are configured to measure voltage patterns between the lead and ground line, the neutral and ground line, and/or the ground line and a reference point. The voltage patterns in the different lines (lead, neutral, ground) may be monitored simultaneously by different components of the monitoring component. Likewise, the monitoring component may be in communication with the processor 1104, the memory 1106, and/or the communication interface 1152.

The memory 1106 stores program instructions that are executable by the one or more processors to cause the one or more processors to perform any one or more portions of the implementations discussed herein. In addition, the memory 1106 and/or the storage 1108 may also maintain a signature data store that includes, for example, signature data of devices known to be at the location and/or device states of devices known to be at the location.

The plug-in sensor 1100 may also include a communication interface 1152, such as a wireless antenna, that enables the plug-in sensor to connect to one or more wireless networks 1199, such as a Wi-Fi network, Bluetooth network, etc., and transmit or receive information, such as detected signature data, voltage data, codes, etc.

In some implementations, the plug-in sensor may also include a pair of electrical prong receptors 1107 that are configured to receive electrical prongs of another device and allow alternating current to passthrough so that the electrical outlet may be utilized by another device, in addition to the plug-in sensor 1100. In still other implementations, the components of the plug-in sensor 1100 may be incorporated entirely into another device, such as a communication component, a communication hub, a device, etc.

Figure 12:
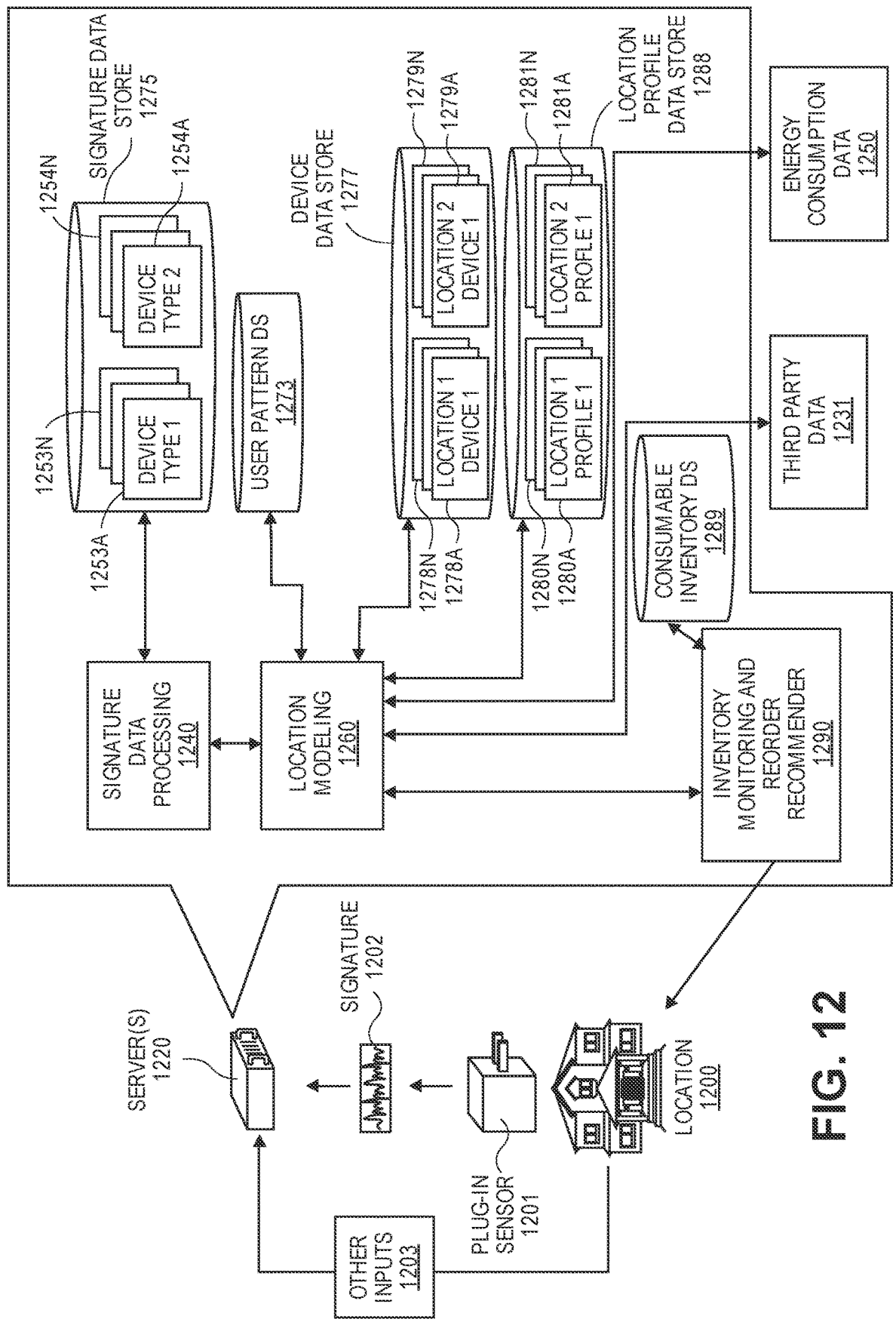
FIG. 12 illustrates example components of a management system, in accordance with described implementations.

FIG. 12 is a conceptual diagram of a server 1220 that processes voltage data/signature data 1202 and/or other inputs 1203 received from plug-in sensors 1201 at various locations 1200, receives third party data 1231 from third parties, energy consumption data for different locations 1200, monitors consumable inventory type quantities at the location, and recommends re-orders of consumable inventory types when the inventory count is depleted, in accordance with described implementations. The various components of the server 1220 may be located on the same or different physical devices. Communication between various components illustrated in FIG. 12 may occur directly or across a network. In operation, the server 1220 may include computer-readable and computer-executable instructions that reside on the server 1220 and perform one or more of the described features or functions, also referred to herein as a management system.

The consumable inventory type monitoring and re-order recommender 1290 may function to determine when an inventory count for one or more consumable inventory types has been depleted to a threshold level, determine the consumption rate for the consumable inventory type, determine that the estimated depletion date for the consumable inventory type is within a re-order window, and recommend a re-order of the consumable inventory type, as discussed herein.

Signature data 1202, or voltage data, from one or more plug-in sensors 1201 at a location 1200 is transmitted in real time, near real time, or periodically to one or more remote computing resources, illustrated in this example as a server 1220. The server receives and processes the signature data 1202 or the voltage data with signature data processing 1240. Processing may include processing the voltage data to determine a signature data and/or determining a device type and/or device state that generated the signature data 1202 by comparing the signature data to stored signature data that is known to be generated by different devices, device types, and/or device states to determine differences between the stored signature data and the received or determined signature data 1202. The signature data store 1275 may maintain device type information and/or signature models, which may include markers representative of different signature data for different device types. For example, signature data of device type 1 may include multiple different markers 1253A-1253N corresponding to different voltage changes at different time intervals that are characteristic of devices of a particular device type. Likewise, signature data of device type 2 may include multiple different markers 1254A-1254N corresponding to signature data generated by devices of that device type.

The device types and/or device signature data maintained in the signature data store 1275 may be aggregated from multiple locations as devices at those locations are determined. The aggregated data may then be used to identify devices and/or device states of devices at other locations and, as those devices/device states are identified, the device signature data at those locations added to the data store. As such, the signature data store 1275 will continue to expand and include device signature data for more and more devices and/or device states of devices.

In some implementations, rather than voltage data or signature data 1202 being sent from the location 1200 to the servers 1220, the plug-in sensor 1201, a communication hub at the location, or a communication component at the location may process the signature data to determine a device, device type, and/or device state of a device at the location that generated the signature data. A device identifier of the determined device and/or device state, a start time and a stop time corresponding to the signature data may then be sent to the servers 1220 for additional processing.

As signature data is collected and devices and/or device states determined, the information, including the device and/or device state identifiers, signature data, times of operation, etc., may be aggregated with other signature data generated by other devices at the location 1200 to develop a location profile 1280, that is stored in a location profile data store 1288, using a location modeling component 1260. The location profile 1280 may include device identifiers and/or signature data for devices and/or device states of devices known or determined to be at the location 1200, any operational relationships between devices and/or device states, signature data of those devices and/or device states, predicted times when those devices will be operating in different device states, etc. In addition, in some implementations, the location profile 1280 may also maintain expected and/or actual energy consumption information for detected devices. For example, received third party data 1231 may include expected energy consumption information for different device models. The location modeling component 1260 may also receive energy consumption data 1250 and utilize that information to determine actual energy consumption for devices at the location. As discussed above, the changes in actual energy consumption at different periods of time may be combined with start times and stop times of determined device operation at the location 1200 to determine the amount of energy actually consumed by devices at the location during operation.

As location profiles 1180 are developed for different locations, those profiles may be stored in a location profile data store 1288. In some implementations, different location profiles may be generated for a location based on, for example, the day of the week, the number of people at the location, etc. Over time, multiple location profiles may be created for each location and maintained in the location profile data store 1288. For example, location 1 may include multiple location profiles 1280A-1280N generated at different points in time for that location. Likewise, location 2 may include multiple location profiles 1281A-1281N generated at different points in time for that location. Every location may include one or more location profiles that are stored in the location profile data store 1288. The location profiles, which may be associated with different periods of time during the year, may be used to predict device states and times during which devices are in high demand/high use or low demand/low use.

In some implementations, signature data and/or voltage data may likewise be used to determine user profiles and/or usage patterns corresponding to the location 1200. For example, signature data and/or voltage data may be used to determine the presence or absence of users at the location and/or at particular areas within the location. As users typically follow a patterned behavior, over time, the signature data may be used to determine those user patterns and such information may be stored in the user pattern data store 1273. For example, signature data from device operation of devices at the location may be aggregated over a period of time (e.g., thirty days) to determine that on Monday, Tuesday, Wednesday, Thursday, and Friday, a user at the location generally enters the kitchen within the structure between 05:00 hours and 05:30 hours, moves to a second room between 06:30 hours and 07:30 hours and then departs the location until approximately 18:00 hours. Such information may be maintained in the user profile for the user.

In some implementations, a device data store 1277 may also be maintained. The device data store 1277 may include information regarding devices at each location. For example, the device data store may maintain device information 1278A-1278N for each of multiple different devices at a first location, maintain device information 1279A-1279N for each of multiple different devices at a second location, etc.

Device information may include, among other information, signature data generated by different device states of the device, the manufacturer of the device, the make, model, and year of manufacture, the power rating of the device, the efficiency of the device, etc. In some implementations, data received from a same type of device operating at different locations may be compared to determine consistency among devices and/or to detect potential device problems or abnormalities. For example, if there are fifty microwaves of Brand A and forty-nine of them have similar power demands but the fiftieth one has a higher power demand, it may be determined that the fiftieth microwave is potentially malfunctioning.

In response to receiving signature data from the server 1220 (FIG. 12) and determining one or more device operations, the inventory monitoring and re-order recommender 1290 may determine inventory depleted from the device operation, update inventory count for the consumable inventory type maintained in the consumable inventory data store 1289 for the location 1200 and determine if the item needs to be reordered, as discussed herein.

Figure 13:
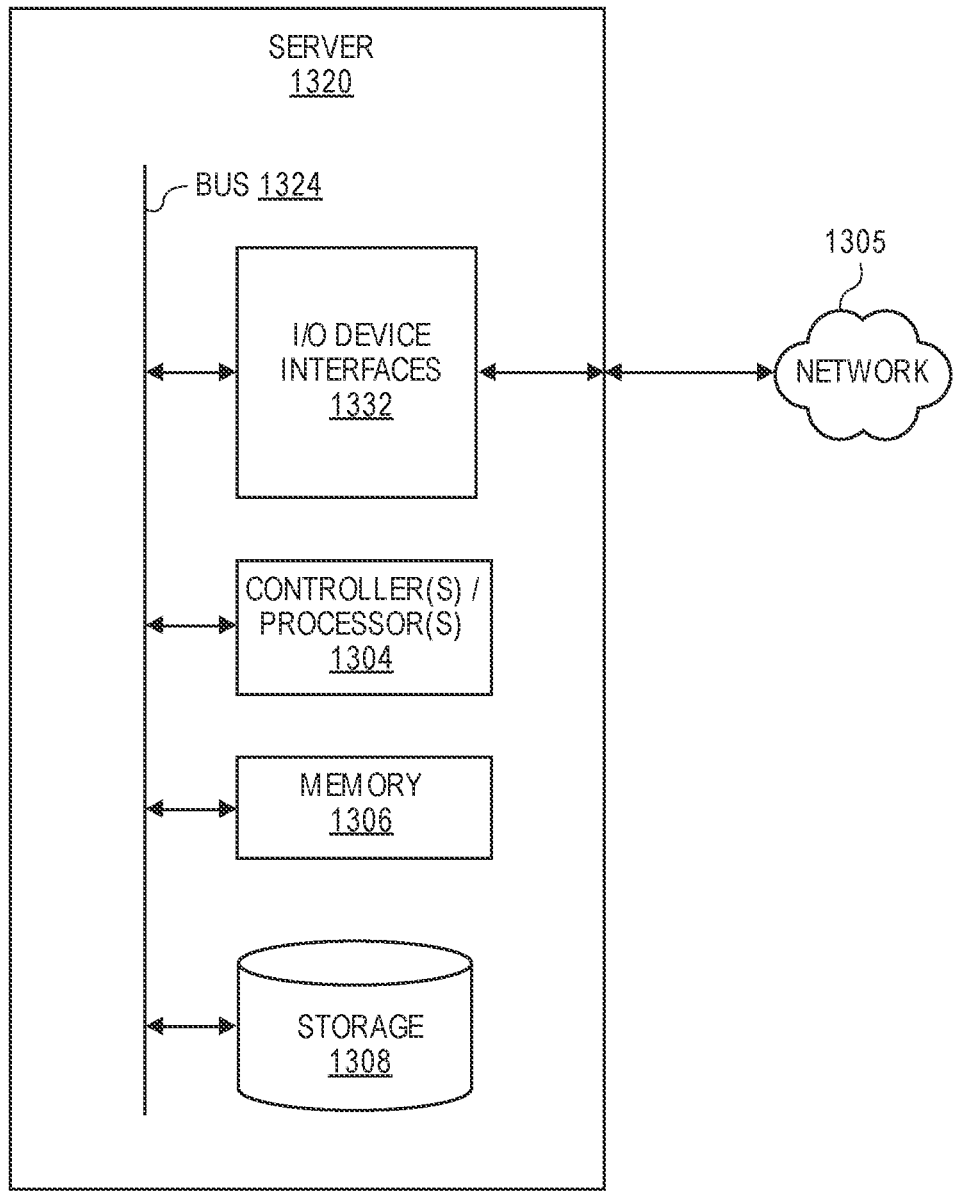
FIG. 13 illustrates example components of a server, in accordance with described implementations.

FIG. 13 is a block diagram conceptually illustrating example components of a remote device, such as a remote server 1320 that may assist with command processing and/or operation of the management system. In operation, the server 1320 may include computer-readable and computer-executable instructions that reside on the server 1320, as will be discussed further below.

The server 1320 may include one or more controllers/processors 1304, that may include a central processing unit (CPU) for processing data and computer-readable instructions, and a memory 1306 for storing data and instructions of the respective device. The memories 1306 may individually include volatile random access memory (RAM), non-volatile read only memory (ROM), non-volatile magnetoresistive (MRAM) and/or other types of memory. The server 1320 may also include a data storage component 1308, for storing data and controller/processor-executable instructions. The data storage component 1308 may include one or more non-volatile storage types such as magnetic storage, optical storage, solid-state storage, etc. The server 1320 may also be connected to removable or external non-volatile memory and/or storage (such as a removable memory card, memory key drive, networked storage, etc.) through an input/output device interface 1332.

Computer instructions for operating the server 1320 and its various components may be executed by the controller(s)/processor(s) 1304, using the memory 1306 as temporary "working" storage at runtime. The server's 1320 computer instructions may be stored in a non-transitory manner in non-volatile memory 1306, storage 1308, or an external device(s). Alternatively, some or all of the executable instructions may be embedded in hardware or firmware on the respective device in addition to or instead of software.

The server 1320 may also include input/output device interfaces 1332. A variety of components may be connected through the input/output device interfaces. Additionally, the server 1320 may include an address/data bus 1324 for conveying data among components of the server 1320. Each component within the server 1320 may also be directly connected to other components in addition to (or instead of) being connected to other components across the bus 1324.

The server 1320 may wirelessly communicate with and receive signature data and/or voltage data from locations and/or provide instructions to devices within the location and/or receive data from the devices. Any form of wired and/or wireless communication may be utilized to facilitate communication between the server 1320, plug-in sensors, communication hubs, communication components, and/or devices. For example, any one or more of 802.15.4 (ZIGBEE), 802.11 (WI-FI), 802.16 (WiMAX), BLUETOOTH, Z-WAVE, near field communication ("NFC"), etc., may be used to communicate between the server 1320 and one or more plug-in sensors, communication components, communication hubs, and/or devices.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method, comprising:
  receiving, from a plug-in sensor plugged into an outlet of an electrical circuit of a location, data measured by the plug-in sensor while the plug-in sensor is inserted into the outlet, wherein the plug-in sensor includes, at least:
    a housing;
    at least one prong protruding from the housing that is inserted into the outlet and interfaces with the electrical circuit at the location;
    one or more potential dividers coupled to the at least one prong and configured to convert a first voltage of the electrical circuit into a second voltage; and
    one or more analog-to-digital converters coupled to the one or more potential dividers and configured to convert the second voltage to the data:
  determining, from the data, a first parameter of the electrical circuit at the location to determine a first operation of a first device at a first time;
  determining, from the data, a second parameter of the electrical circuit at the location to determine a second operation of a second device at a second time;
  determining, based at least in part on a sequence of the first operation of the first device at the first time and the second operation of the second device at the second time, a consumable inventory type associated with the location;

decrementing an inventory count maintained for the consumable inventory type to produce a current inventory count for the consumable inventory type at the location, the decrement made at least in part in response to determining the first operation of the first device at the first time and the second operation of the second device at the second time; and subsequent to decrementing the inventory count, sending a message associated with ordering the consumable inventory type for fulfillment to the location.

2. The method of claim 1, further comprising:
receiving a starting inventory count for the consumable inventory type;
associating the consumable inventory type with the location; and
associating the consumable inventory type with the sequence such that the current inventory count for the consumable inventory type will be decremented in response to a determined operation of the first device and the second device at the location and in the sequence.

3. The method of claim 2, wherein receiving the starting inventory count includes:
receiving, from a user associated with the location, the starting inventory count; or
receiving an indication of an anticipated delivery of the consumable inventory type to the location.

4. The method of claim 2, wherein:
determining the sequence further includes determining a time duration during which the first device and the second device are to operate as part of the sequence; and
wherein determining the consumable inventory type is further based on determining that the first time and the second time are within the time duration.

5. The method of claim 2, wherein the consumable inventory type is associated with the sequence based at least in part on one or more of: an input provided by a user, historical data, or aggregated information relating to device operations and consumable inventory type usage.

6. The method of claim 1, further comprising:
determining a consumption rate for the consumable inventory type, wherein the consumption rate is determined based at least in part on a starting inventory count, the current inventory count, and a duration of time between a third time associated with the starting inventory count and a fourth time associated with the current inventory count.

7. The method of claim 6, further comprising:
determining, based at least in part on the consumption rate and the current inventory count, an estimated depletion date when the consumable inventory type will be fully depleted;
determining that the estimated depletion date is within a re-order window associated with the consumable inventory type; and
determining to send the message based at least in part on determining that the estimated depletion date is within the re-order window.

8. The method of claim 1, wherein sending the message includes:
sending a re-order confirmation request to a user, wherein the message is at least one of audible or visual.

9. The method of claim 1, further comprising:
determining a second consumable inventory type corresponding to the second device; and
decrementing a second inventory count maintained for the second consumable inventory type to produce a second current inventory count for the second consumable inventory type, the decrement made at least in part in response to determining the first operation of the first device.

10. The method of claim 1, wherein determining the first parameter includes at least one of:
determining a voltage potential between at least one of a lead line and a ground, a neutral line and the ground, or the ground and a reference;
determining a current on the electrical circuit; or
determining a voltage and the current on the electrical circuit.

11. A system, comprising:
a plug-in sensor, including:
a housing;
at least one prong protruding from the housing that is inserted into an outlet of an electrical circuit at a location;
one or more potential dividers coupled to the at least one prong and configured to convert a first voltage of the electrical circuit into a second voltage; and
one or more analog-to-digital converters coupled to the one or more potential dividers and configured to convert the second voltage to the data; and
a computing system, comprising:
one or more processors; and
a memory storing program instructions that, when executed by the one or more processors, cause the one or more processors to at least:
receive, from the plug-in sensor, the data measured by the plug-in sensor while the plug-in sensor is inserted into the outlet at the location;
determine, from the data, a first parameter of the electrical circuit at the location to determine a first operation of a first device;
determine, from the data, a second parameter of the electrical circuit at the location to determine a second operation of a second device;
determine, based at least in part on a sequence of the first operation of the first device and the second operation of the second device, a consumable inventory type associated with the location;
decrement an inventory count maintained for the consumable inventory type to produce a current inventory count for the consumable inventory type at the location, the decrement made at least in part in response to determination of the first operation of the first device and the second operation of the second device; and
subsequent to the inventory count being decremented, send a message associated with ordering the consumable inventory type for fulfillment to the location.

12. The system of claim 11, wherein the first operation occurs at a first time and the second operation occurs at a second time that is different than the first time.

13. The system of claim 11, wherein the program instructions that, when executed by the one or more processors, further cause the one or more processors to at least:
receive a starting inventory count for the consumable inventory type;

associate the consumable inventory type with the location;

determine the sequence for the first operation of the first device and the second operation of the second device; and associate the consumable inventory type with the sequence such that the current inventory count for the consumable inventory type will be decremented in response to the sequence of operation of the first device and the second device at the location.

14. The system of claim 13, wherein:

the program instructions that, when executed by the one or more processors to determine the sequence, further cause the one or more processors to at least:

determine a time duration during which the first device and the second device are to operate as part of the sequence; and the program instructions that, when executed by the one or more processors to determine the consumable inventory type, further cause the one or more processors to at least:

determine the first operation of the first device at a first time;

determine the second operation of the second device at a second time; and determine that the first time and the second time are within the time duration.

15. The system of claim 11, wherein the program instructions that, when executed by the one or more processors, further cause the one or more processors to at least:

determine a consumption rate for the consumable inventory type, wherein the consumption rate is determined based at least in part on a starting inventory count, the current inventory count, and a duration of time between a first time associated with the starting inventory count and a second time associated with the current inventory count.

16. The system of claim 11, wherein the program instructions that, when executed by the one or more processors to determine the first parameter, further cause the one or more processors to at least:

determine, from the data, a voltage potential between at least one of a lead line and a ground, a neutral line and the ground, or the ground and a reference;

determine, from the data, a current on the electrical circuit; or determine, from the data, a voltage and the current on the electrical circuit.

17. A computer implemented method, comprising:

receiving, from a plug-in sensor plugged into an outlet of an electrical circuit of a location, data measured by the plug-in sensor while the plug-in sensor is inserted into the outlet, wherein the plug-in sensor includes, at least:

a housing;

at least one prong protruding from the housing that is inserted into the outlet;

one or more potential dividers coupled to the at least one prong and configured to convert a first voltage of the electrical circuit into a second voltage; and one or more analog-to-digital converters coupled to the one or more potential dividers and configured to convert the second voltage to the data;

determining, from the data, a first parameter of the electrical circuit at the location to determine a first operation of a first device;

determining, from the data, a second parameter of the electrical circuit at the location to determine a second operation of a second device;

determining a sequence for the first operation and the second operation;

determining, based at least in part on the sequence, a consumable inventory type;

decrementing an inventory count maintained for the consumable inventory type to produce a current inventory count for the consumable inventory type at the location; and subsequent to decrementing the inventory count, sending a message associated with ordering the consumable inventory type for fulfillment to the location.

18. The computer implemented method of claim 17, wherein:

determining the sequence further includes determining a time duration during which the first device and the second device are to operate as part of the sequence; and wherein determining the consumable inventory type is further based on determining that the first operation of the first device and the second operation of the second device occurred within the time duration.

19. The computer implemented method of claim 17, wherein the consumable inventory type is associated with the sequence based at least in part on one or more of: an input provided by a user, historical data, or aggregated information relating to device operations and consumable inventory type usage.

20. The computer implemented method of claim 17, further comprising:

determining a consumption rate for the consumable inventory type;

determining, based at least in part on the consumption rate and the current inventory count, an estimated depletion date when the consumable inventory type will be fully depleted;

determining that the estimated depletion date is within a re-order window associated with the consumable inventory type; and sending the message based at least in part on determining that the estimated depletion date is within the re-order window.

* * * * *